(12) United States Patent
Chen

(10) Patent No.: US 8,922,520 B2
(45) Date of Patent: Dec. 30, 2014

(54) INTEGRATED PIXEL STRUCTURE, INTEGRATED TOUCH PANEL LCD DEVICE AND METHOD OF CONTROLLING THE SAME

(75) Inventor: Chih-Chiang Chen, Taipei Hsien (TW)

(73) Assignee: Acer Incorporated, Taipei (TW)

( * ) Notice: Subject to any disclaimer, the term of this patent is extended or adjusted under 35 U.S.C. 154(b) by 1367 days.

(21) Appl. No.: 12/320,477

(22) Filed: Jan. 27, 2009

(65) Prior Publication Data

US 2010/0053112 A1 Mar. 4, 2010

(30) Foreign Application Priority Data

Aug. 26, 2008 (TW) ................ 97132521 A

(51) Int. Cl.
| | |
|---|---|
| *G06F 3/045* | (2006.01) |
| *G09G 3/36* | (2006.01) |
| *G02F 1/1333* | (2006.01) |
| *G06F 3/041* | (2006.01) |
| *G06F 3/044* | (2006.01) |
| *G02F 1/1339* | (2006.01) |
| *G02F 1/1362* | (2006.01) |

(52) U.S. Cl.
CPC .......... *G02F 1/13338* (2013.01); *G06F 3/0412* (2013.01); *G06F 3/044* (2013.01); *G02F 1/13394* (2013.01); *G02F 1/136213* (2013.01)
USPC ......................................... 345/174; 345/104

(58) Field of Classification Search
CPC ..... G09G 3/36; G09G 3/3607; G09G 3/3548; G09G 3/0488; G09G 3/041; G09G 3/044; G02F 1/133; G02F 1/1343; G02F 1/1335
See application file for complete search history.

(56) References Cited

U.S. PATENT DOCUMENTS

| | | |
|---|---|---|
| 7,158,129 B2 | 1/2007 | Nakajima |
| 2006/0109222 A1 | 5/2006 | Lee et al. |
| 2007/0131936 A1 | 6/2007 | Kang et al. |
| 2007/0262967 A1 | 11/2007 | Rho |

(Continued)

FOREIGN PATENT DOCUMENTS

| | | |
|---|---|---|
| CN | 1982960 A | 6/2007 |
| EP | 1 939 670 A2 | 7/2008 |

(Continued)

OTHER PUBLICATIONS

The Extended Search Report of Application No. EP 1 09 15 0891, dated Mar. 3, 2010.

(Continued)

*Primary Examiner* — Kenneth Bukowski
(74) *Attorney, Agent, or Firm* — Nicholas Trenkle; Stites & Harbison, PLLC.

(57) ABSTRACT

An integrated pixel structure, an integrated touch panel LCD device and a method of controlling the same are provided. The integrated pixel structure includes a transistor matrix substrate, a color filter substrate being parallel with the transistor matrix substrate, and a liquid crystal layer placed between the transistor matrix substrate and the color filter substrate. The transistor matrix substrate includes a first transistor, a first storage capacitor connected to the first transistor, a second transistor, a second storage capacitor connected to the second transistor, and a conductive protrusion. The conductive protrusion is disposed corresponding to the second storage capacitor and configured to electrically connect the second storage capacitor and the color filter substrate.

23 Claims, 19 Drawing Sheets

(56) References Cited

U.S. PATENT DOCUMENTS

| | | | |
|---|---|---|---|
| 2008/0055502 A1 | 3/2008 | Wu et al. | |
| 2008/0186288 A1* | 8/2008 | Chang | 345/174 |
| 2008/0198143 A1 | 8/2008 | Kinoshita et al. | |

FOREIGN PATENT DOCUMENTS

| | | |
|---|---|---|
| JP | 2003-131798 | 5/2003 |
| JP | 2008-65302 | 3/2008 |
| KR | 10-2007-0063263 | 6/2007 |
| WO | WO 2007/146779 | 12/2007 |

OTHER PUBLICATIONS

Notification of Reasons for Rejection issued by the Japanese Patent Office on May 31, 2011 in the corresponding Japanese Patent Application No. 2009-034854 (3 pages) along with a English language translation (4 pages).

Office Action issued from Taiwanese Patent Office in corresponding Taiwanese Patent Application No. 097132521, dated Apr. 27, 2012, pp. 1-12.

* cited by examiner

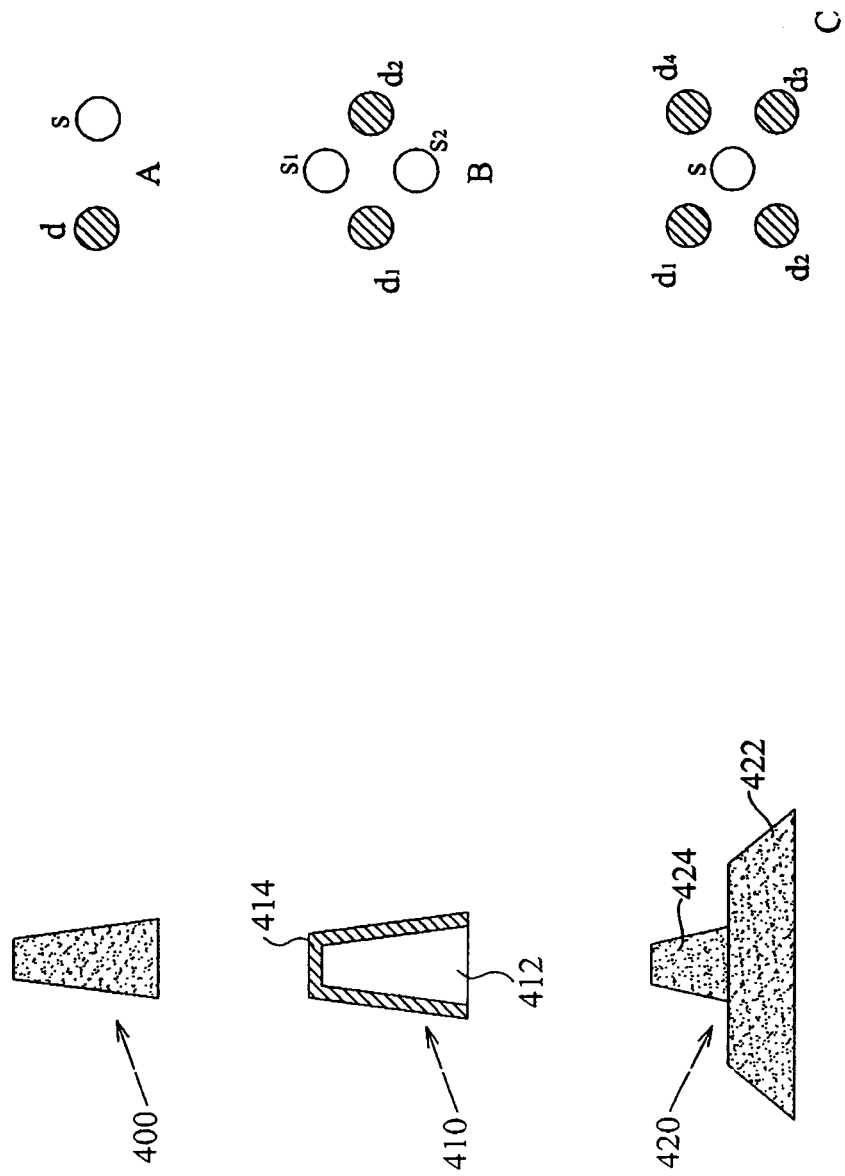

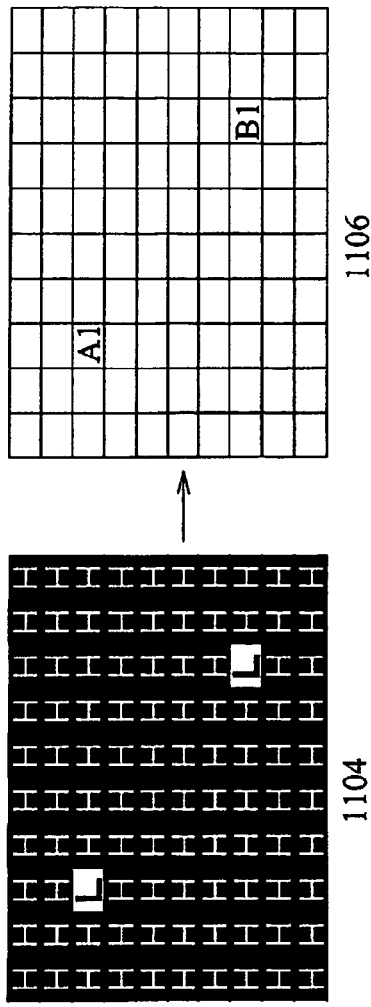
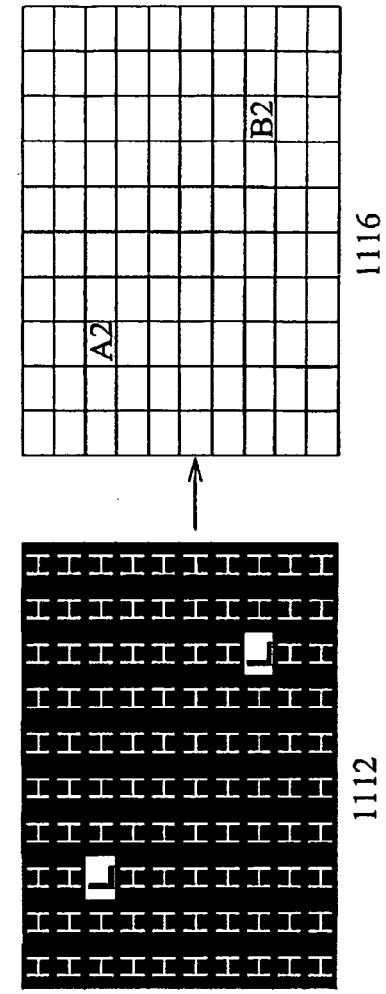
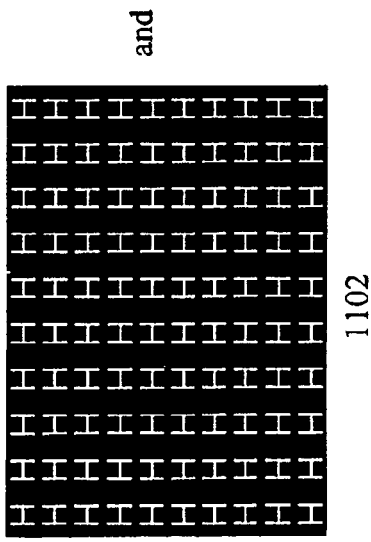
FIG.11A
FIG.11B

INTEGRATED PIXEL STRUCTURE, INTEGRATED TOUCH PANEL LCD DEVICE AND METHOD OF CONTROLLING THE SAME

CROSS-REFERENCE TO RELATED APPLICATIONS

This application claims priority to Taiwan Patent Application No. 97132521 entitled "INTEGRATED PIXEL STRUCTURE, INTEGRATED TOUCH PANEL LCD DEVICE AND METHOD OF CONTROLLING THE SAME", filed on Aug. 26, 2008, which is incorporated herein by reference and assigned to the assignee herein.

FIELD OF INVENTION

The present invention relates to a touch panel liquid crystal display (LCD) device, and more particularly to an integrated touch panel LCD device and a method of controlling the same.

BACKGROUND OF THE INVENTION

Comparing with the traditional input devices, such as keyboards and mice, the touch panels have advantages of space saving and simple humanization operation interface.

The conventional LCD device with touch-sensitive function is usually configured in a plug-in way, in which a touch panel is stacked on a LCD panel directly. FIG. 1 is a side cross-sectional view of a conventional touch panel LCD device 100, primarily including a touch panel 110 and a LCD panel 120. Generally speaking, a touch region 112 corresponding to the display region 125 of the display panel 120 is disposed in the center of the touch panel 110, and a detecting circuit 114 is disposed in the peripheral of the touch panel 110. When an object touches the touch region 112, an electrical signal is generated correspondingly and then transmitted to other circuit on the circuit board 130 through a connector 132 for the further process.

Besides, in order to increase stability and reduce vibration, a plastic buffer pad 140 is usually placed between the touch panel 110 and the LCD panel 120, and then a housing 150 is adopted for fixing all elements. Therefore, the conventional plug-in touch panel LCD device is inconvenience for users due to the increased thickness and weight. Furthermore, in addition to the problems of the decreased brightness and the increased reflectivity, the air gap between the touch panel 110 and the LCD panel 120 may cause some color non-uniformity defects (Mura), such as the Newton ring effect.

Therefore, it is desired to have a lightweight and reliable touch panel LCD device.

SUMMARY OF THE INVENTION

In light of the problems of the prior art, the present invention provides an integrated touch panel LCD device and a method of controlling the same, which possesses the advantages of customization, lightweight, no air gap, and multi-touch function.

According to one aspect of the present invention, an integrated pixel structure is provided. The integrated pixel structure of the present invention includes a transistor matrix substrate, a color filter substrate, and a liquid crystal layer. The color filter substrate is disposed above the transistor matrix substrate, and is substantially parallel with the transistor matrix substrate. The liquid crystal layer is interposed between the transistor matrix substrate and the color filter substrate. The transistor matrix substrate includes a first transistor, a first storage capacitor connected to the first transistor, a second transistor, a second storage capacitor connected to the second transistor, and a conductive protrusion. The conductive protrusion is disposed corresponding to the second storage capacitor, and configured to electrically connect the second storage capacitor and the color filter substrate when the color filter substrate is pressed.

According to another aspect of the present invention, an integrated touch panel LCD device is provided. The integrated touch panel LCD device of the present invention includes a liquid crystal panel, a gate driving circuit, a data driving circuit, a touch reading circuit, and a comparison circuit. The liquid crystal panel includes a plurality of integrated pixel structures of claim 1, a plurality of gate lines, and a plurality of data lines. The gate driving circuit is configured to output a control signal to the plurality of gate lines. The data driving circuit is configured to output display data and touch reference data to the plurality of data lines. The touch reading circuit is coupled to the plurality of data lines for reading data stored in the second storage capacitors of the plurality of integrated pixel structure. The comparison circuit is coupled to the touch reading circuit for receiving and calculating the stored data to obtain touching information corresponding to a touch position on the liquid crystal panel.

According to still another aspect of the present invention, a method for controlling an integrated touch panel LCD device is provided. The integrated touch panel LCD device includes a liquid crystal panel which includes a plurality of integrated pixel structures of claim 1, a plurality of data lines, and a plurality of gate lines. The method of the present invention includes the steps of: transmitting display data to the first storage capacitors for updating a display image of the liquid crystal panel; transmitting touch reference data to the second storage capacitors; reading data stored in the second storage capacitors; and calculating the stored data to obtain touching information corresponding to a touch position on the liquid crystal panel.

Other aspects of the present invention would be stated and easily understood through the following description or the embodiments of the present invention. The aspects of the present invention would be appreciated and implemented by the elements and their combinations pointed out in the appended claims. It should be understood that the above summary of the invention and the following detailed description are only illustrative but not to limit the present invention.

BRIEF DESCRIPTION OF THE DRAWINGS

The drawings are employed to illustrate the embodiments and the principles of the present invention in conjunction with the description. However, it should be understood that the present invention is not limited to the shown configurations and elements, in which:

FIG. 4A illustrates various structures of the conductive protrusion in FIGS. 3A and 3B;

FIG. 4B depicts different combinations of the conductive protrusion and the spacer in a pixel;

FIG. 11A-11D are illustrative diagrams showing the different logical operations for determining the touch position in accordance with different embodiments of the present invention;

DETAILED DESCRIPTION OF THE PREFERRED EMBODIMENTS

A touch panel LCD device with multi-touch function is disclosed, which can be implemented without adding any touch-sensitive glass/film or changing mechanism structure. The objects, features and advantages of the present invention would be more apparent by referring to the following description of the preferred embodiments and FIGS. 2-16. However, the apparatuses, elements, and steps of the method described in the following embodiments are intended to illustrate the present invention, but not to limit the scope of the invention.

Figure 1:
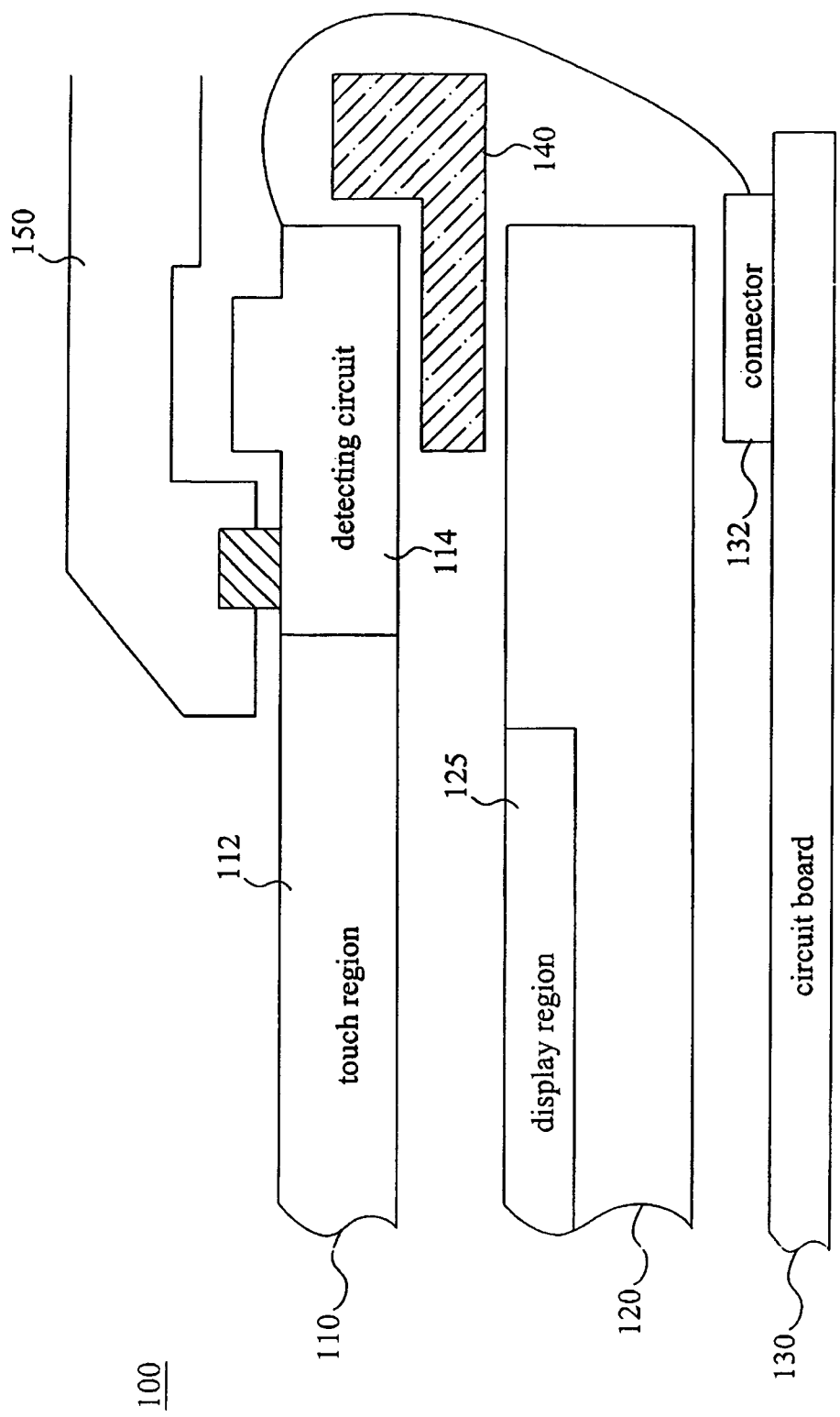
FIG. 1 is a cross-sectional view of a conventional touch panel.
Figure 2:
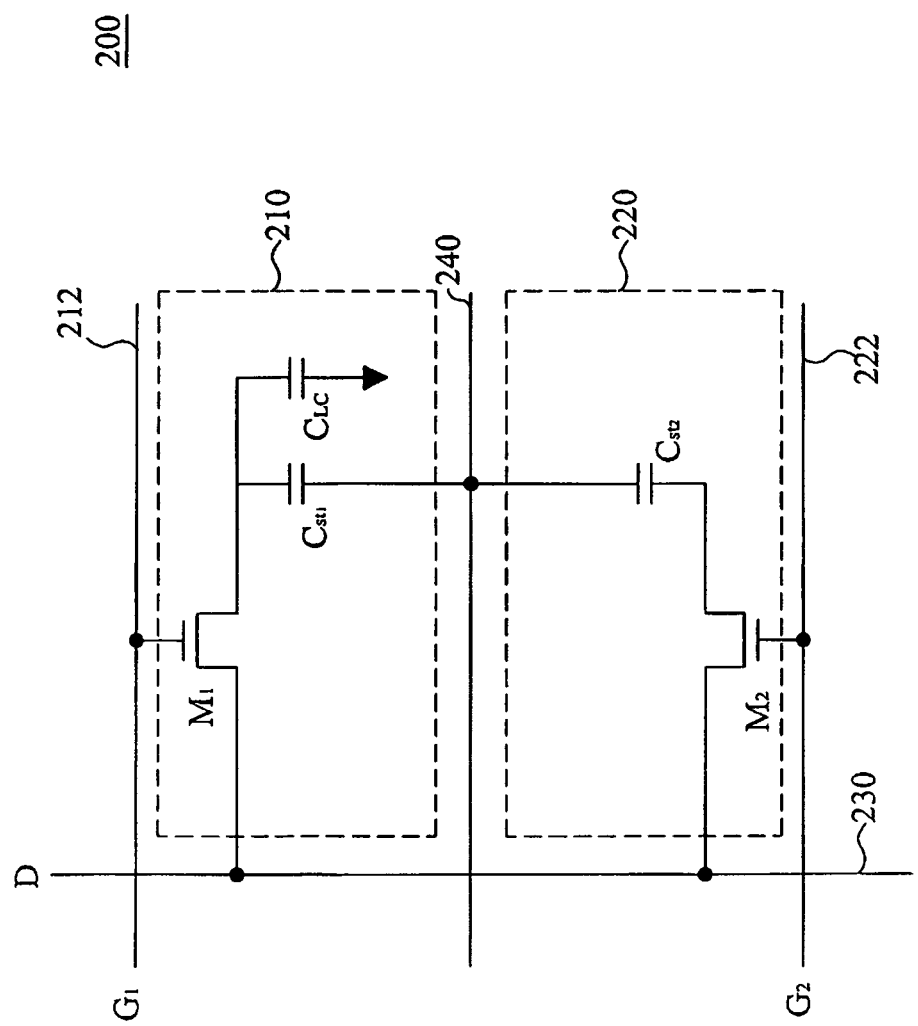
FIG. 2 is a circuit diagram of one integrated pixel structure of an integrated touch panel LCD device according to an embodiment of the present invention.

FIG. 2 is a circuit diagram of one integrated pixel structure 200 of an integrated touch panel LCD device according to an embodiment of the present invention. The integrated pixel structure 200 includes a display unit 210 and a touch unit 220. The display unit 210 includes a thin-film transistor (TFT) $M_1$, a storage capacitor $C_{st1}$, and a LC capacitor $C_{LC}$, and the touch unit 220 includes a TFT $M_2$ and a storage capacitor $C_{st2}$. The drain of the TFT $M_1$ connects to a data line 230, the gate of the TFT $M_1$ connects to a gate line 212, and the source of the TFT $M_1$ connects to the storage capacitor $C_{st1}$ and the LC capacitor $C_{LC}$. One terminal of the storage capacitor $C_{st1}$ connects to a common line 240. Once the TFT $M_1$ has been turned on by the gate line 212, the voltage on the data line 230 can be transmitted to the LC capacitor $C_{LC}$ through the TFT $M_1$ and then kept for a time period by the storage capacitor $C_{st1}$. The functions and structures of the elements within the display unit 210 are similar to that of the pixel structure of the conventional LCD device, so the detail description thereof is omitted.

Referring to FIG. 2, in the touch unit 220, the drain of the TFT $M_2$ connects to the data line 230, the gate of the TFT $M_2$ connects to the gate line 222, and the source of the TFT $M_2$ connects to the storage capacitor $C_{st2}$. The TFT $M_2$ can be turned on by the gate line 222, so that the storage capacitor $C_{st2}$ can be read or written through the data line 230. According to the present invention, when an object touches and presses a position of the integrated touch panel LCD device corresponding to the pixel structure 200, a discharged path to the storage capacitor in the pixel structure 200 is created and the voltage stored in the storage capacitor drops accordingly. Therefore, the precise position of the touch point can be obtained by sequentially reading the data stored in the touch units of every pixel structures of the integrated touch panel LCD device.

Figure 3A:
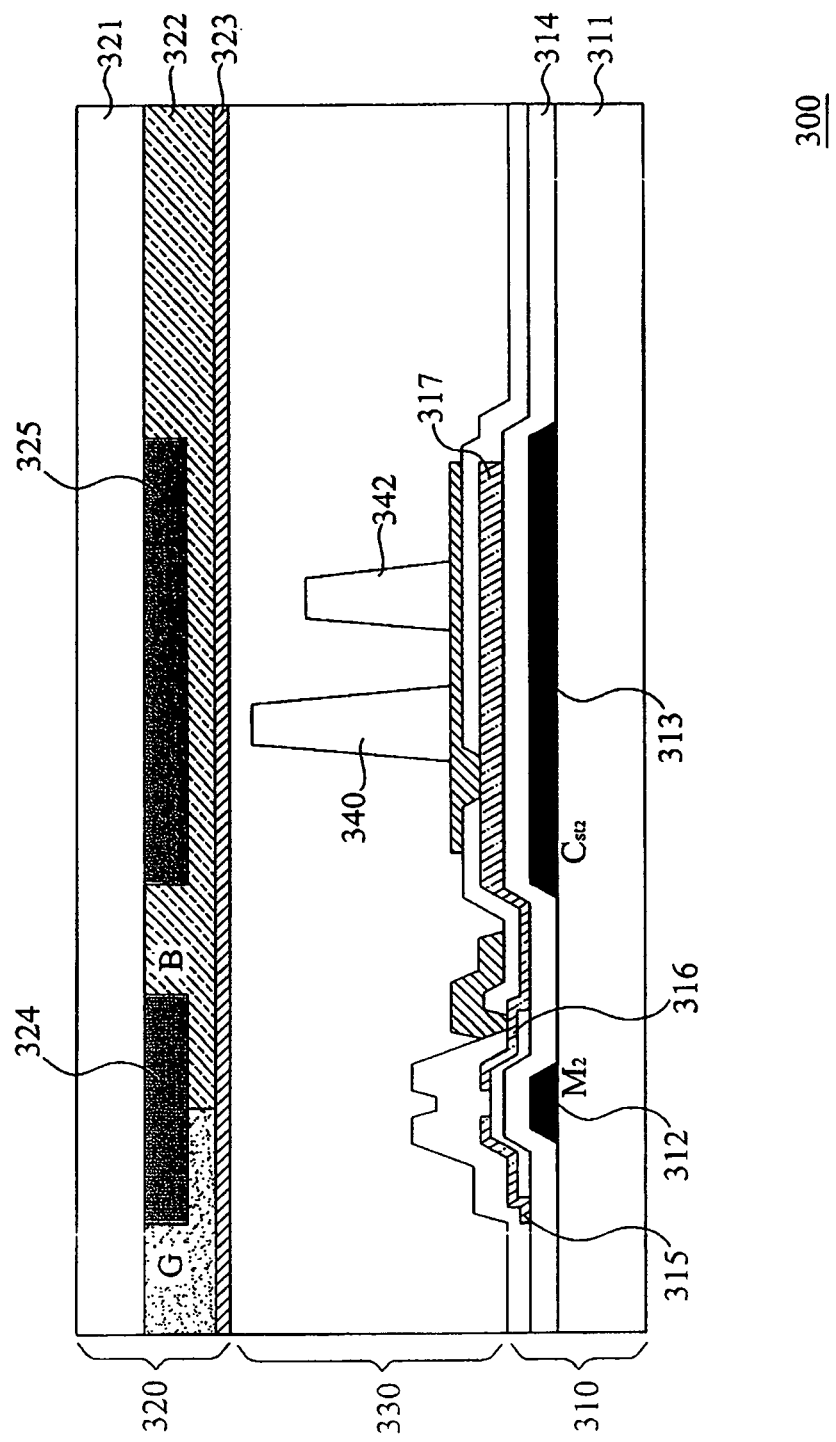
FIGS. 3A and 3B are cross-sectional views of the touch unit in FIG. 2 according to two different embodiments of the present invention respectively.
Figure 3B:
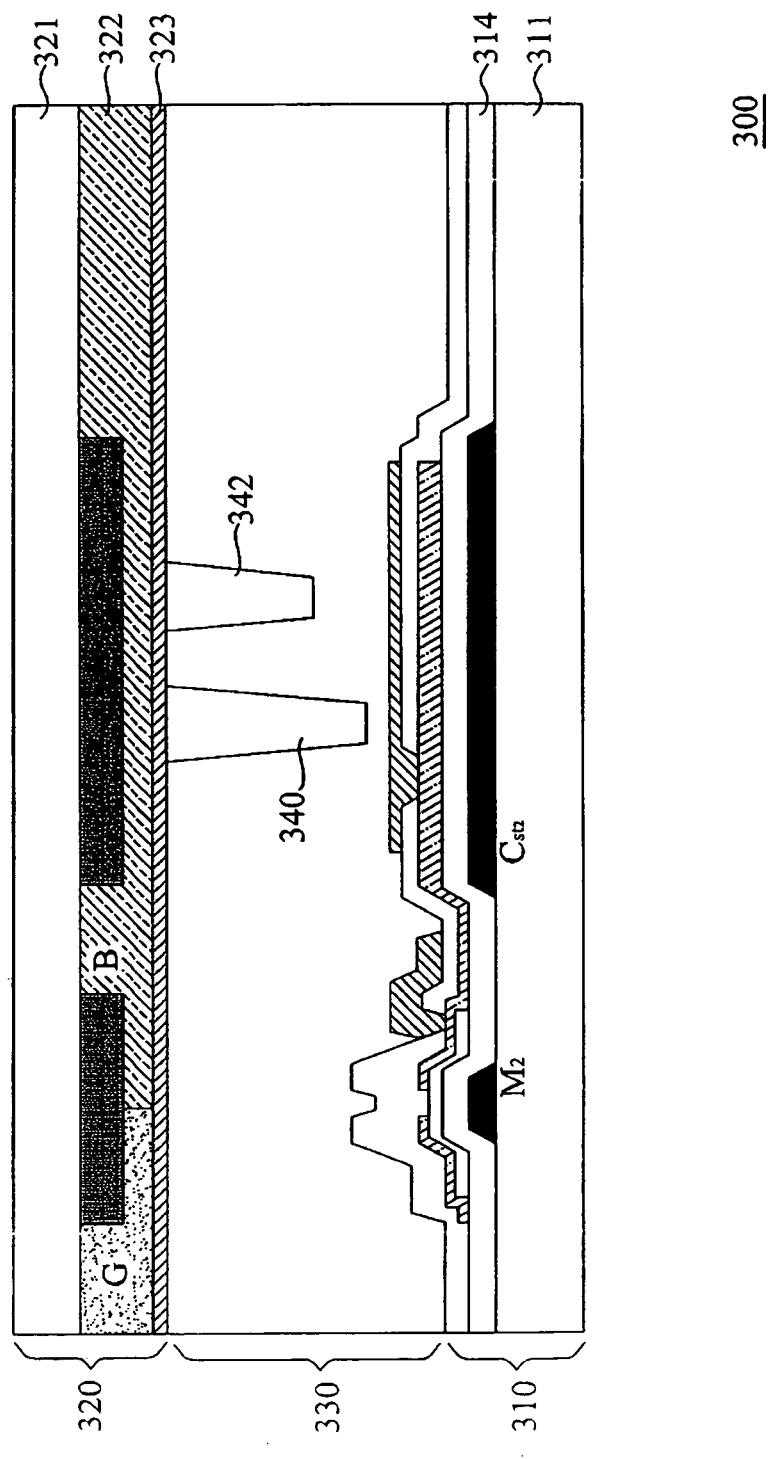

FIGS. 3A and 3B are cross-sectional views of the touch unit 220 in FIG. 2 according to two different embodiments of the present invention respectively. Referring to FIG. 3A, the touch unit 300 includes a TFT matrix substrate 310, a color filter substrate 320, and a liquid crystal layer 330 interposed between the two substrates 310 and 320. In the TFT matrix substrate 310, the gate lines 312 and 313 are formed on a transparent substrate 311 first, and a gate insulating layer 314 is then formed to cover the substrate 311 and the gate lines 312 and 313. Next, a drain electrode 315 and a source electrode 316 are formed on both sides above the gate line 312 to form the TFT $M_2$ of FIG. 2. The drain electrode 315 forms a part of the data line 230 in FIG. 2, and the source electrode 316 extends to connect to a conductive electrode 317. The conductive electrode 317, the gate line 313, and part of the gate insulating layer 314 interposed therebetween form the storage capacitor $C_{st2}$ of FIG. 2. The color filter substrate 320 includes black matrixes 324 and 325 formed on the transparent substrate 321, a RGB color filter 322, and a common electrode 323.

Continuing to refer to FIG. 3A, the conductive protrusion 340 is formed above and connected with the storage capacitor $C_{st2}$. The conductive protrusion 340 is spaced a predetermined distance from the color filter substrate 320. When a user touches and presses the liquid crystal display device, a small deformation is generated in the touch position (i.e. the color filter substrate 320 bends downward), which forces the conductive protrusion 340 to contact with the color filter substrate 320. In the meantime, the charges stored in the storage capacitor $C_{st2}$ flow through the conductive protrusion 340 to the common electrode 323 of the color filter substrate 320. Typically, the distance between the conductive protrusion 340 and the color filter substrate 320 is preferably, but not limited to, about 0.1 μm to about 2 μm. A spacer 342 can be additionally formed, for example, around the conductive protrusion 340 as a support of the liquid crystal display device for improving the pressure resistant to of the LCD device. The main purpose of the conductive protrusion 340 is to provide a discharge path to the storage capacitor $C_{st2}$ when touch unit 300 is touched and pressed, and therefore the position of the conductive protrusion 340 is not limited by the present invention. For example, the conductive protrusion 340 can be disposed on the color filter substrate 320, as shown in FIG. 3B.

Typically, referring to FIGS. 2, 3A, and 3B, a pixel structure (such as 200 in FIG. 2) of the integrated touch panel LCD device of the present invention includes a touch unit and a display unit, and the touch unit at least includes a TFT, a storage capacitor, a conductive protrusion, and a spacer. In the touch unit, the conductive protrusion disposed on the TFT matrix substrate or on the color filter substrate can be used as a discharge path, and the spacer can be disposed on the TFT matrix substrate or on the color filter substrate for maintaining the normal operation of the LCD device. It should be noted that not each pixel of the integrated touch panel LCD device has to be embedded with a touch unit, and the arrangement of the touch units within the integrated touch panel LCD device may vary with the required resolution of practical application. For example, it can be arranged that each sub-pixel (i.e. R, G, or B sub-pixel) is embedded with one touch unit, each combined pixel composed of three sub-pixels (R, G, B) is embedded with one touch unit, or only one of N combined RGB pixels is embedded with a touch unit. In addition, the height, size, and number of the conductive protrusions and the spaces in each touch unit can be adjusted according to actual needs of individual cases.

FIG. 4A illustrates various structures 400, 410, and 420 of the conductive protrusion 340 in FIGS. 3A and 3B. For example, the conductive protrusion 400 can be formed by forming a pillar with organic material, such as resin, and then adding conductive particles into the formed pillar. In another embodiment, the conductive protrusion 410 can be formed by covering a pillar 412 composed of organic material (such as resin) with a conductive film 414 composed of conductive material. In still another embodiment, the conductive protrusion 420 can be formed by forming an electric conductor on a spacer 422 which is used as a support, which combines the discharge function and the support function. As described above, except for the conductive protrusion, one or more spacers can be formed additionally for enhancing the supportability of the panel. FIG. 4B depicts different combinations A, B, and C of the conductive protrusion(s) and the spacer(s) in a pixel. In combination A, there are one conductive protrusion d and one spacer s in a pixel. In combination B, there are two conductive protrusions d1 and d2 and two spacers s1 and s1 in a pixel. In combination C, there are one spacer s and four surrounding conductive protrusions d1, d2, d3, and d4 in a pixel. Typically, the more the number of the conductive protrusions are, the faster the discharge rate is. The various structures of the conductive protrusions and/or the spacers can be formed by various semiconductor processes well known to those skilled in the art. For example, the pillars with different heights can be formed by a signal exposure step with a specific photomask and an organic photo-sensitive material, or by performing a film formation process several times.

Figure 5:
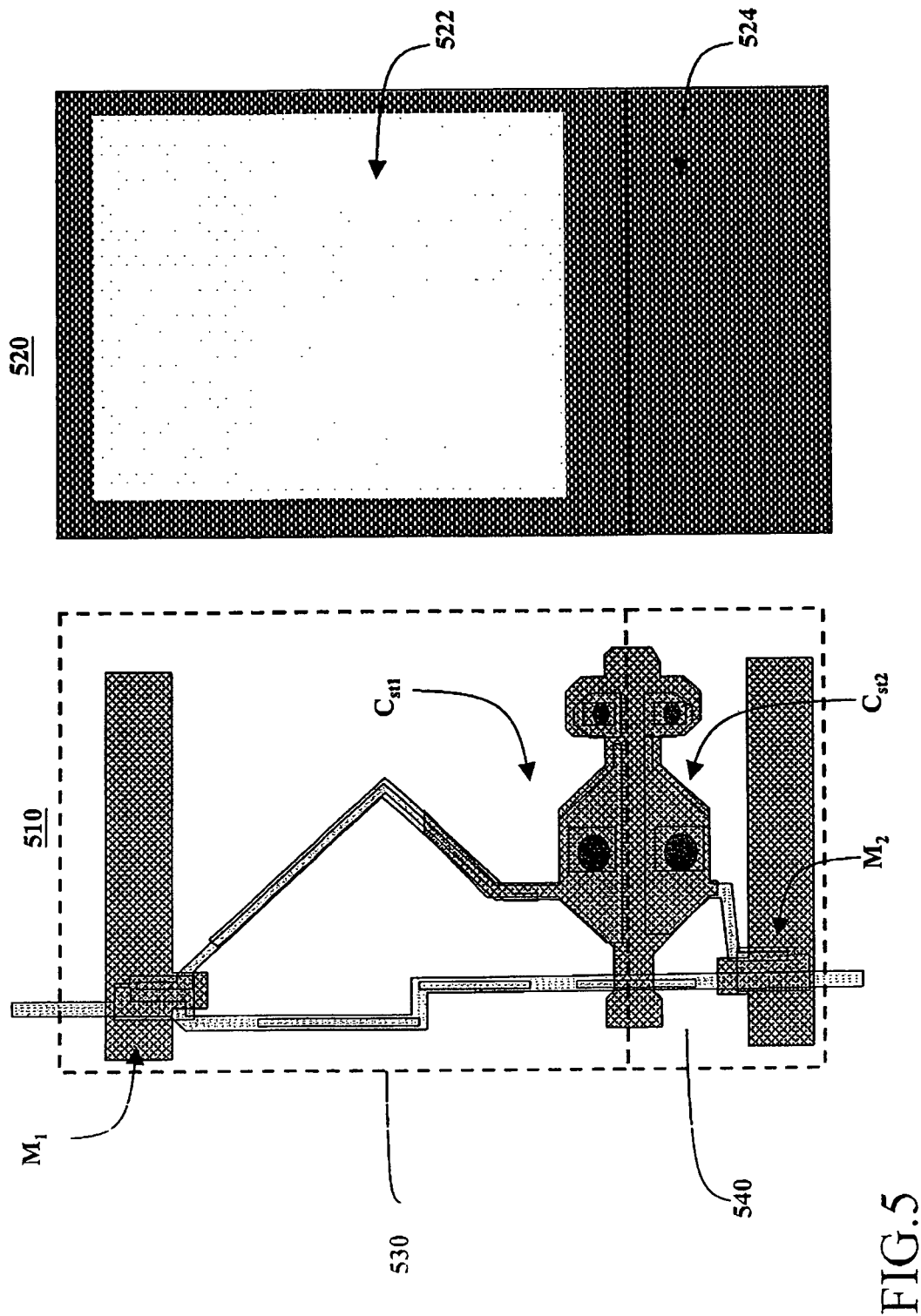
FIG. 5 illustrates a circuit layout of an integrated pixel structure having a touch unit according to one embodiment of the present invention.

FIG. 5 illustrates a circuit layout of an integrated pixel structure 500 including a touch unit according to one embodiment of the present invention, which includes a TFT matrix substrate 510 and a color filter substrate 520. The TFT matrix substrate 510 includes a display region 530 and a touch region 540. The display region 530 includes a TFT $M_1$ and a storage capacitor $C_{st1}$, and the touch region 540 includes a TFT $M_2$ and a storage capacitor $C_{st2}$. The color filter substrate 520 includes a color filter region 522 and a black matrix region 524. The effective circuit of the integrated pixel structure 500 can refer to the circuit shown in FIG. 2. Generally, for preventing light leakage or other Mura defects as the panel is pressed, the conductive electrode in the touch region 540 is preferably opaque, or the touch region 540 is located corresponding to the position of the black matrix region 524 in the color filter substrate 520. For example, in the embodiment of FIG. 3A or 3B, the positions of the TFT $M_2$ and the storage capacitor $C_{st2}$ in the TFT matrix substrate 310 respectively correspond to the position of the black matrixes 324 and 325 in the color filter substrate 320 to ensure the display quality of the LCD device.

Figure 6:
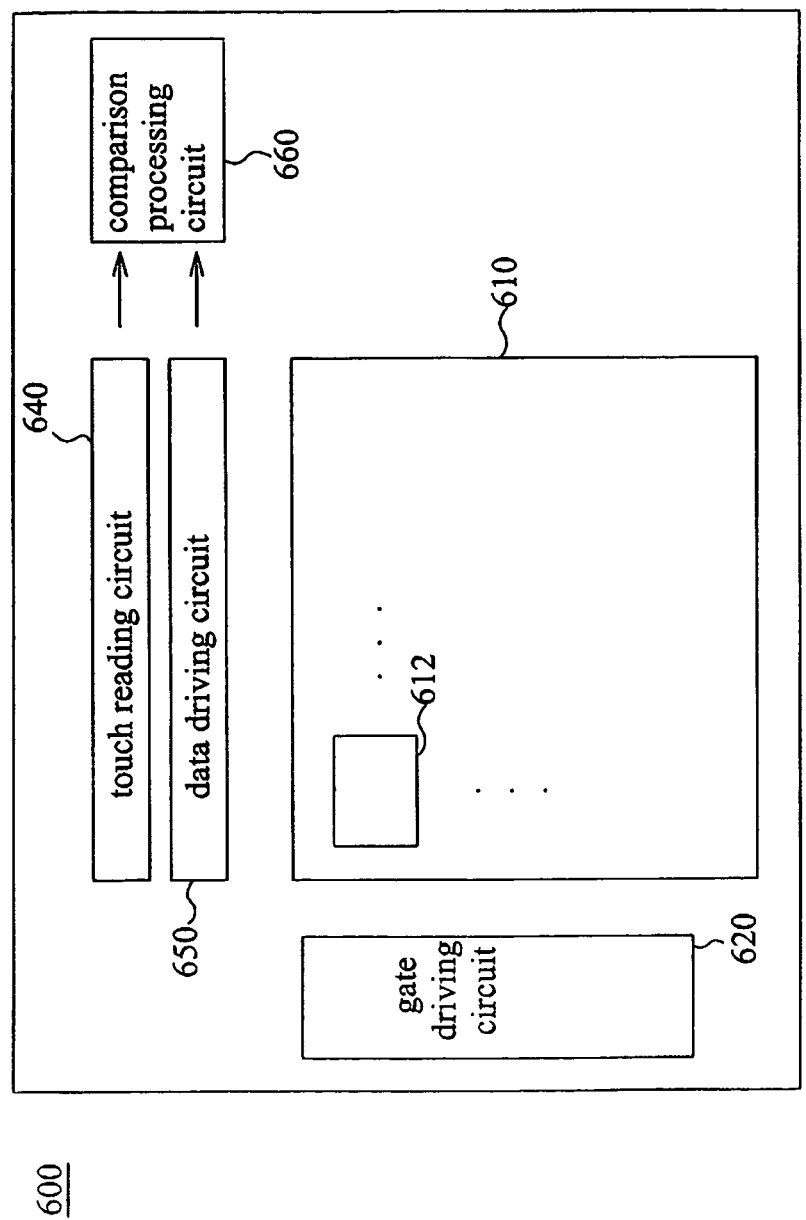
FIG. 6 is a block diagram of an integrated touch panel LCD device according to one embodiment of the present invention.

FIG. 6 is a block diagram of an integrated touch panel LCD device 600 according to one embodiment of the present invention, which includes a liquid crystal panel 610 having a plurality of pixel structures 612, a gate driving circuit 620, a touch reading circuit 640, a data driving circuit 650, and a comparison processing circuit 660. Each pixel structure 612 includes a display unit and a touch unit (as shown in FIG. 2) in which, the display units of all the pixel structures in the liquid crystal panel 610 can be updated and all the embedded touch units can be read and written by the driving of the gate driving circuit 620 and the data driving circuit 650. The touch reading circuit 640 is configured to read the value of voltage stored in the storage capacitor of each touch unit, and may include an amplifier, an analog-to-digital converter, a noise filter circuit, and other known circuit elements. Since the charges in the touch unit of the pixel structure corresponding to the touch position would be discharged, coordinate of the touch position can be determined precisely by reading the data stored in the touch units of all the pixel structures through sequential scanning and then comparing the read data through the comparison processing circuit 660 (such as comparing the data written into the touch unit and the data read from the touch unit).

Figure 7:
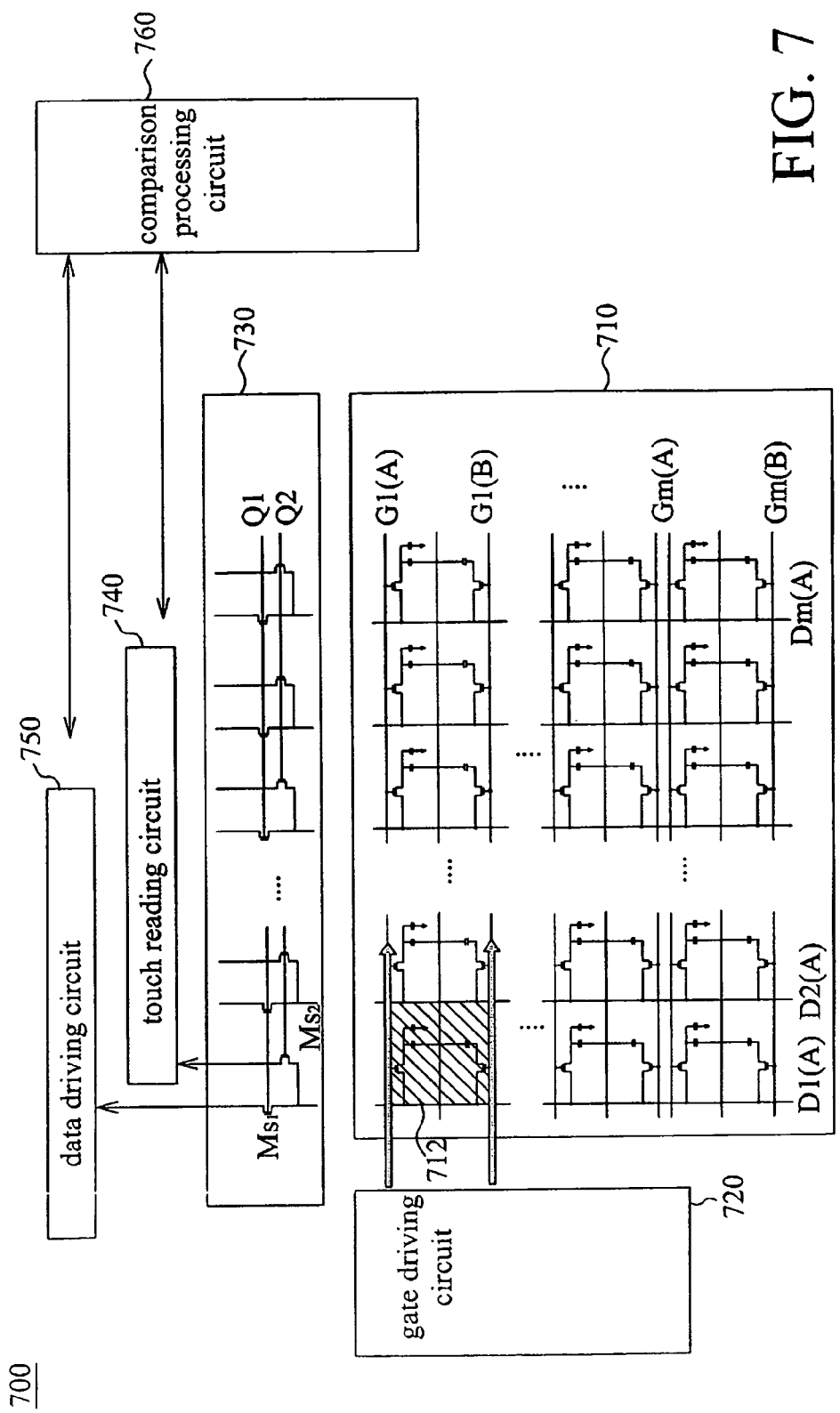
FIG. 7 illustrates a circuit structure of the integrated touch panel LCD device in FIG. 6 in accordance with one embodiment of the present invention.

FIG. 7 illustrates a circuit structure 700 of the integrated touch panel LCD device 600 in FIG. 6 in accordance with one embodiment of the present invention, which mainly includes a liquid crystal panel 710, a gate driving circuit 720, a display/read switching circuit 730, a touch reading circuit 740, a data driving circuit 750, and a comparison processing circuit 760. The liquid crystal panel 710 includes a plurality of gate lines G1(A)-Gm(A) and G1(B)-Gm(B) and a plurality of data lines D1(A)-Dm(A). In this embodiment, each pixel structure 712 includes a display unit and a touch unit, as shown in FIG. 2, and is driven by two gate lines and one data line. The gate driving circuit 720 is configured to input control signals to the gate lines G1(A)-Gm(A) for driving the display units of the pixel structures 712, and to input control signals to the gate lines G1(B)-Gm(B) for driving the touch units of the pixel structures 712. The data driving circuit 750 is configured to transmit display data to each of the display units or transmit touch reference data to each of the touch units through the data lines D1(A), D2(A), ..., and Dm(A), and the touch reading circuit 740 is configured to read the data stored in each of the touch unit through each of the data line D1(A), D2(A), ..., and Dm(A) respectively. The display/read switching circuit 730 connects to the data driving circuit 750 and the touch reading circuit 740 respectively for switching the data driving circuit 750 and the touch reading circuit 740 to electrically connect with the data lines D1(A), D2(A), ..., and Dm(A) at different time. In the embodiment shown in FIG. 7, the display/read switching circuit 730 can include a plurality of switch units composed of switch transistors $M_{S1}$ and $M_{S2}$, and each switch unit connects to different data lines D1(A), D2(A), ..., and Dm(A). The transistors $M_{S1}$ and $M_{S2}$ can be turned on or turned off through control lines Q1 and Q2 respectively. When the transistor $M_{S1}$ turns on, the data driving circuit 750 can electrically connect to the data lines D1(A), D2(A), ..., and Dm(A), while when the transistor $M_{S2}$ turns on, the touch reading circuit 740 can electrically connect to the data lines D1(A), D2(A), ..., and Dm(A). The comparison processing circuit 760 connects with the data driving circuit 740 and touch reading circuit 740 respectively, and compares the touch reference data written into the data lines D1(A), D2(A), ..., and Dm(A) by the data driving circuit 750 and the data read from the D1(A), D2(A), ..., and Dm(A) by the touch reading circuit 740 to obtain coordinate of the touch position. In another embodiment, the comparison processing circuit 760 can connect with the touch reading circuit 740 only, and adopt a predetermined threshold voltage and a logical operation to calculate the data read by the touch reading circuit 740 such that the coordinate of the touch position can be determined.

Figure 8:
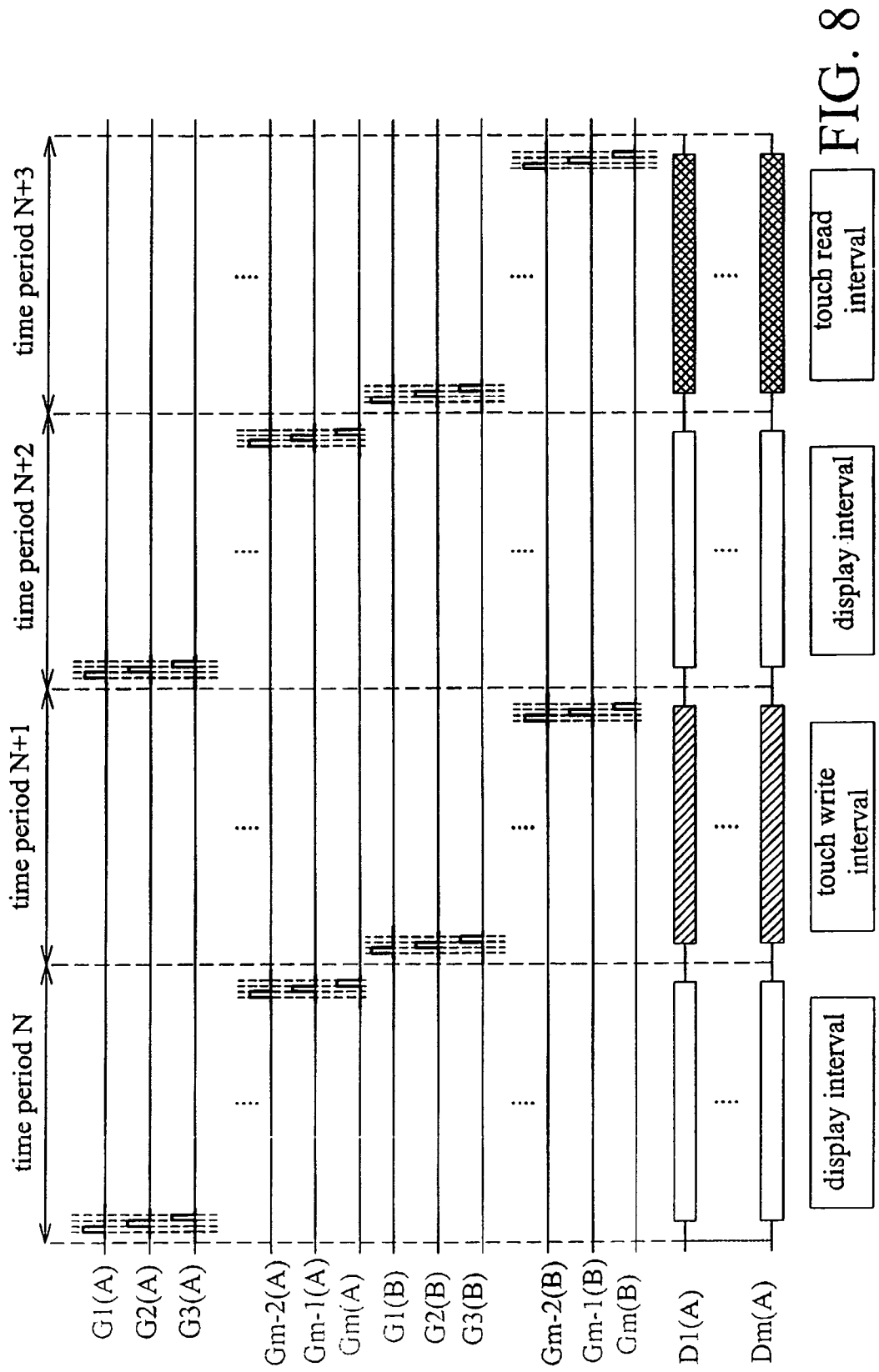
FIG. 8 is a timing diagram of signals on each of gate lines and data lines in the circuit of FIG. 7.

FIG. 8 is a timing diagram of signals on each of gate lines and each of the data lines in the circuit of FIG. 7. Referring to FIGS. 7 and 8 together, during the N-th time period, the gate driving circuit 720 sequentially inputs m pulses to the gate lines G1(A)-Gm(A), respectively, such that the transistors of each display unit will be turned on sequentially. In the meantime, the data driving circuit 750 transmits the display data to each of the data lines D1(A), D2(A), ..., Dm(A) through the display/read switching circuit 730 for updating the display image of the liquid crystal panel 710. Next, during the (N+1)-th time period, the gate driving circuit 720 sequentially inputs m pulses to the gate lines G1(B)-Gm(B), respectively, for turning on transistors of each touch unit sequentially. In the meantime, the data driving circuit 750 still electrically connects with each of the data lines D1(A), D2(A), ..., Dm(A) through the display/read switching circuit 730, and transmits the touch reference data to each data lines D1(A), D2(A), ..., Dm(A) for writing data into each of the touch units. Next, during the (N+2)-th time period, the gate driving circuit 720 sequentially inputs m pulses to the gate lines G1(A)-Gm(A) again, and updates the data stored in each display unit through the data driving circuit 750 again. Next, during the (N+3)-th time period, gate driving circuit 720 sequentially inputs m pulses to the gate lines G1(B)-Gm(B), and the display/read switching circuit 730 switches the touch reading circuit 740 to electrically connect with each of the data lines D1(A), D2(A), ..., Dm(A) for reading the data stored in each of the touch units. As described, when the liquid crystal panel 710 is touched and pressed, a discharge path will be generated in the touch unit of the pixel corresponding to the touch position so that the voltage value stored in the touch unit will drop accordingly, and therefore coordinate of the touch position can be determined precisely by comparing the touch reference data written during the (N+1)-th time period and the data read during the (N+3)-th time period.

Figure 9B:
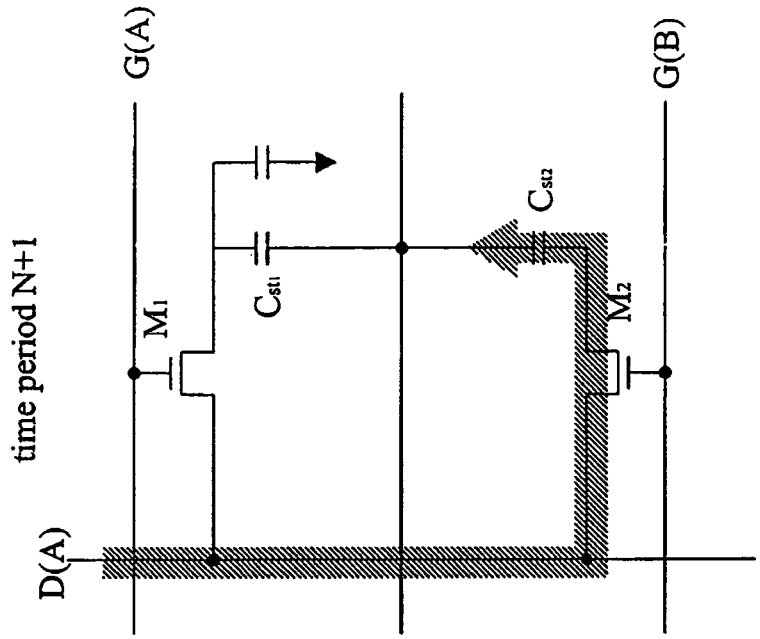
FIGS. 9A-9D are illustrative diagrams showing read and write operations to a pixel structure based on the timing diagram of FIG. 8.
Figure 9A:
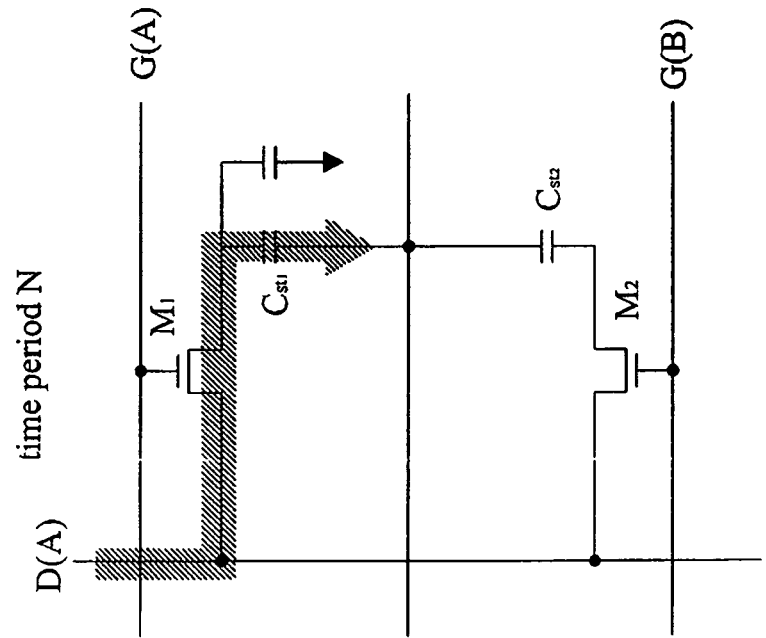
Figure 9D:
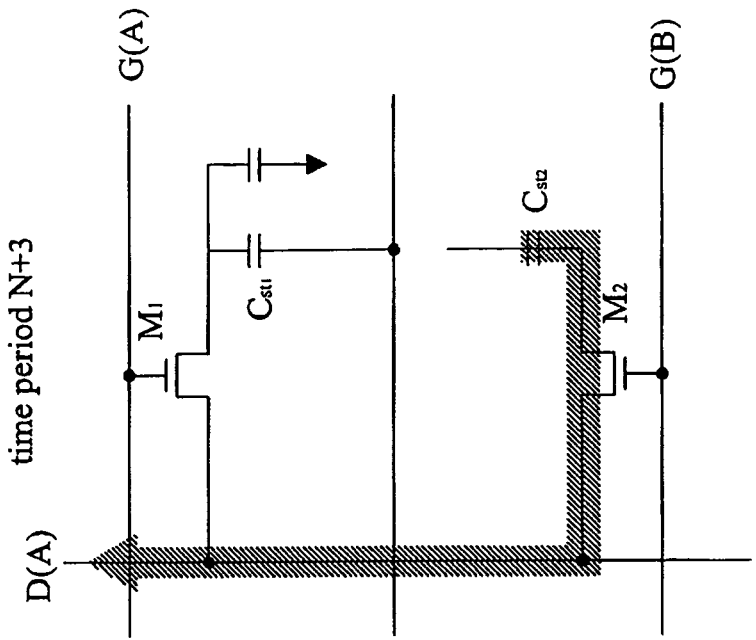
Figure 9C:
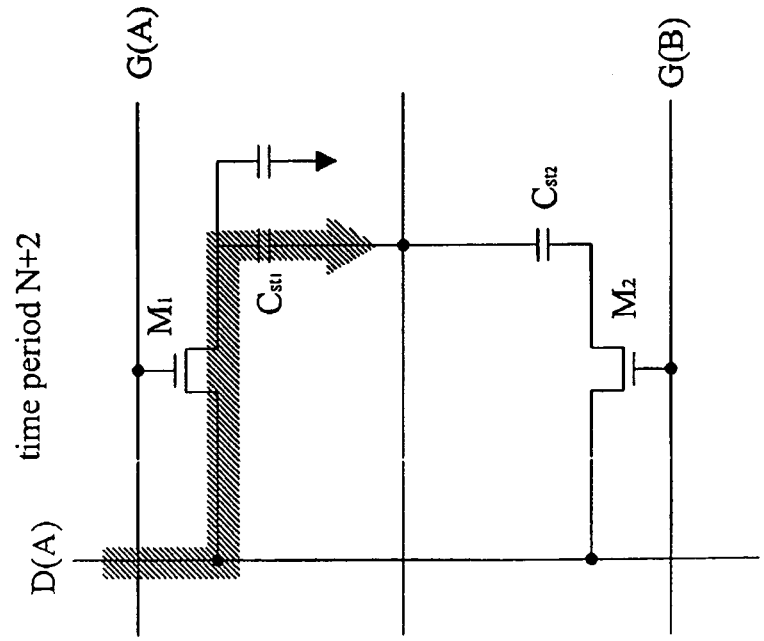

FIGS. 9A-9D illustrate read and write operations performed on a pixel structure based on the timing diagram of FIG. 8. Referring to FIG. 9A, during the N-th time period, the TFT $M_1$ is turned on by a high voltage on the gate line G(A), and the TFT $M_2$ is turned off by a low voltage on the gate line G(B), so that the display data can be transmitted by the data line D(A) and then written into the storage capacitor $C_{st1}$ through the TFT $M_1$. Referring to FIG. 9B, during the (N+1)-th time period, the TFT $M_1$ is turned off by a low voltage on the gate line G(A), and the TFT $M_2$ is turned of by a high voltage on the gate line G(B), so that the touch reference data can be transmitted by the data line D(A) and then written into the storage capacitor $C_{st2}$ through the TFT $M_2$. Referring to FIG. 9C, during the (N+2)-th time period, the TFT $M_1$ is turned on and the TFT $M_2$ is turned off, which is the same as during the N time period, so that the display data can be transmitted by the data line D(A) and then written into the storage capacitor $C_{st1}$ through the TFT $M_1$ again. Referring to FIG. 9D, during the (N+3)-th time period, the TFT $M_1$ is turn off and the TFT $M_2$ is turned on, so that the data stored in the storage capacitor $C_{st2}$ can be transmitted to the data line D(A) through the TFT $M_2$ and then to the touch reading circuit 740 for following calculation and/or comparison process.

In the embodiments shown in FIGS. 8 and 9A-9D, the display units perform data update operation every alternating time period (i.e. writing the display data during N-th time period, (N+2)-th time period, etc.), and the touch units perform the data update operation once every four time periods (i.e. writing the touch reference data during (N+1)-th time period, (N+5)-th time period, etc.). In other words, the operation frequency of the display units is twice as large as that of the touch units. For example, the operation frequency of the display units can be 60 Hz, and the operation frequency of the touch units can be 30 Hz. In another embodiment, the operation frequency of the touch units can be adjusted according to the actual needs, for example, each time after the display units perform update operation twice to five times, the touch units may perform write/read operation only once. It should be noted that although each pixel shown in FIG. 7 has a touch unit therewithin, the density of the touch units in the touch panel LCD device can vary with the required resolution.

Figure 10:
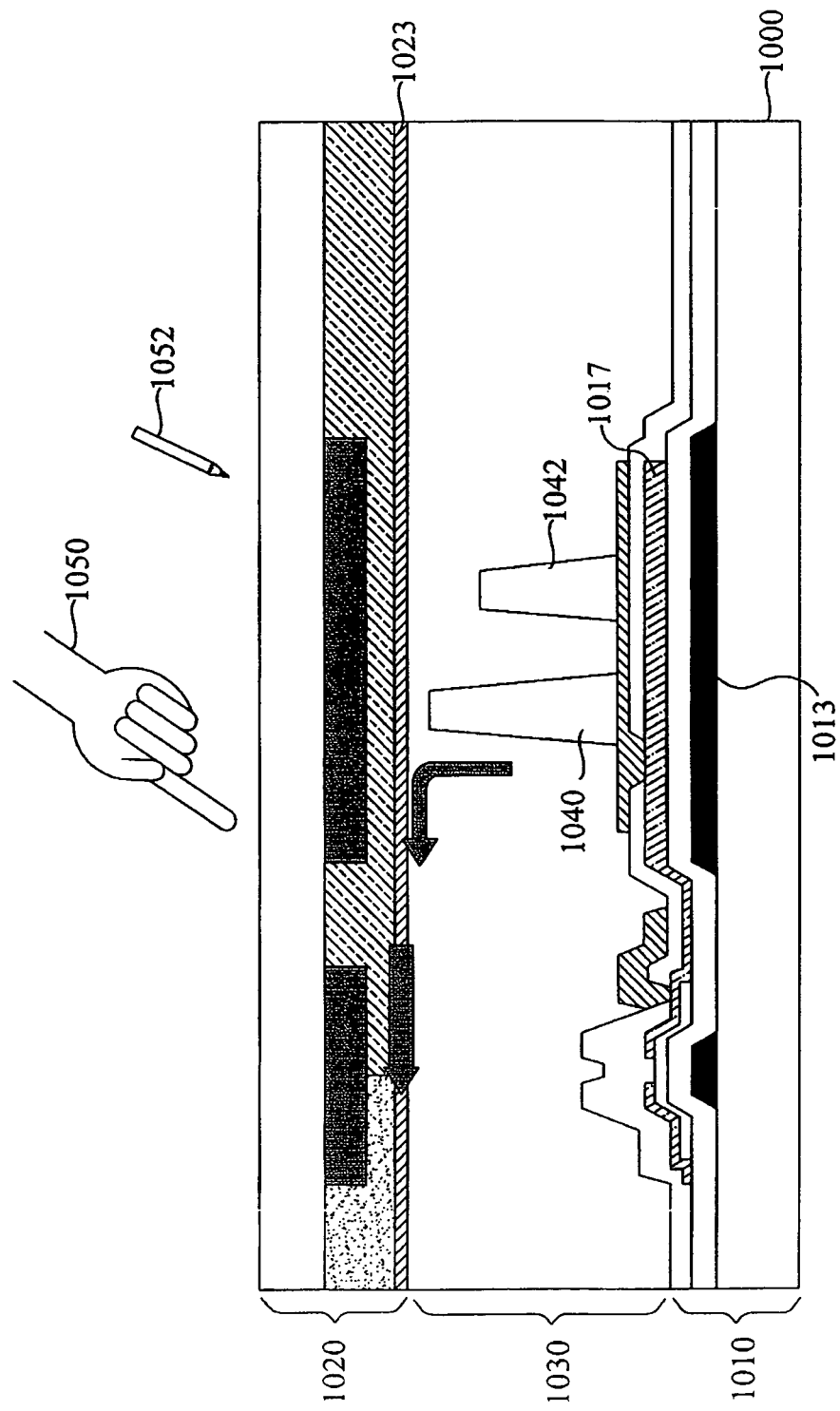
FIG. 10 illustrates a discharge path when the touch panel LCD device is touched by an object in accordance with one embodiment of the present invention.

FIG. 10 illustrates a discharge path generated at the time when the LCD device is touched by an object in accordance with one embodiment of the present invention. When an object (such as a finger 1050 or a pen 1052) touches the LCD device, the color filter substrate 1020 is bent under the downward pressure, such that a discharge path (as indicated by the arrow in FIG. 10) in the touch unit 1000 corresponding to the touched position is induced. The structure of the touch unit 1000 is similar to that of the touch unit in FIG. 3A, which mainly includes TFT matrix substrate 1010, color filter substrate 1020, and liquid crystal layer 1030. Referring to FIG. 10, the conductive protrusion 1040 touches with the color filter substrate 1020 under pressure, such that the storage capacitor (formed by the conductive electrode 1017 and the gate line 1013) in the touch unit 1000 is discharged through the common electrode 1023 of the color filter substrate 1020. Typically, the material of the common electrode 1023 may be ITO, IZO, AZO, or other transparent conductive material. The height, size, amount, and density of the conductive protrusion 1040 can be adjusted according to the requirement. Besides, there may be a number of conductive protrusions with different heights for controlling the resistance of the discharge path and the touch pressure. Generally, the larger the number of the conductive protrusions 1040 within the touch unit 1000 are, the fast the discharge velocity is. The height, size, and density of the spacers 1042 can be adjusted based on the application requirement for maintaining adequate space for the liquid crystal layer, providing high pressure resistant, and increasing the lifetime of the panel. The present invention doesn't limit the number of the conductive protrusions and spacers within one touch unit.

Figure 11C:
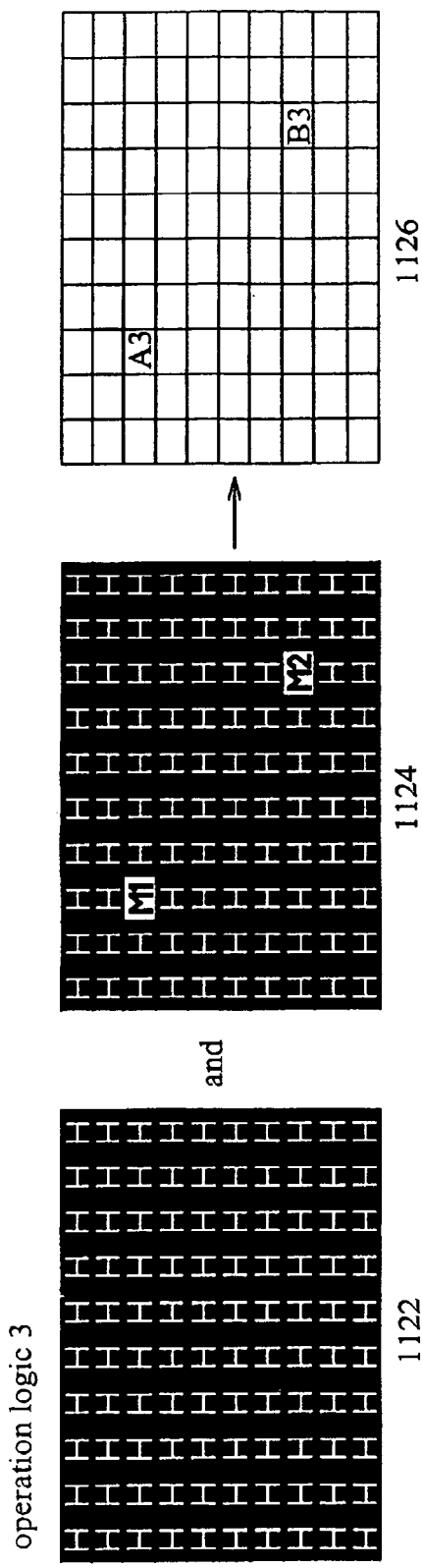

FIGS. 11A-11D are illustrative diagrams showing the different logical operations for determining coordinate of touch position in accordance with different embodiments of the present invention. Referring to FIG. 11A, each touch unit of the liquid crystal display is charged, i.e. the data written into each touch unit is H (high voltage level), as shown in Table 1102. When touch occurs, the voltage stored in the touch unit corresponding to the touch position is discharged to L (low voltage level), as shown in Table 1104. The coordinate of the touch position (A1, B1) can be obtained by comparing the touch reference data (1102) written into each touch unit and the stored data (1104) read from each touch unit, as shown in Table 1106. FIG. 11B shows another logical operation of the present invention, which can obtain coordinate of touch position directly by reading the voltage values stored in each touch unit. Generally, the touch reference data written into each touch unit are logic high digital signals, and the voltage value stored in the touch unit corresponding to the touch position is reduced to low due to the discharge phenomenon, as shown in Table 1112. Therefore, the coordinate of the touch position (A2, B2) can be obtained by reading the voltage values stored in each touch unit, as shown in Table 1116. In this embodiment, a threshold voltage can be set to filter out the adverse noise to avoid misjudging the coordinate of the touch position. For example, if the touch reference data written into each touch unit is 5V, the threshold voltage can be set as 4V, such that it will be referred as H when the voltage read from the touch unit is higher than 4V, and referred as L when the voltage read from the touch unit is lower than 4V. As shown in FIGS. 11A and 11B, different touch points correspond to different touch units, and the data stored in each touch unit can be read individually. Therefore, the touch position can be determined precisely and independently to achieve the multi-touch function.

According to the present invention, except for the multi-touch function, other touching information, such as touch area or touch pressure, can be obtained by adopting different schemes of touch units and read circuit. For example, several conductive protrusions with different heights can be formed within one touch unit, such that only the conductive protrusions with higher height can be conducted to form discharge paths when touch pressure is small, and all the conductive protrusions can be conducted to accelerate the discharge speed when touch pressure is large enough. Therefore, by the specific design on density of the touch units, amount and location of the conductive protrusions and spacers, data update frequency, and structure of read circuit, the touch pressure can be determined according to the stored data read from the touch units. FIG. 11C illustrates an operation logic for achieving pressure-sensitive function in accordance with one embodiment of the present invention, in which the Table 1122 shows the touch reference date written in to each touch unit (i.e. high voltage level, H), and Table 1124 shows the stored voltage read from each touch unit. M1 is different from M2, and H>M2>M1. In this embodiment, coordinate of the touch position (A3, B3) (as shown in Table 1126) can be determined, and it can also be determined that touch pressure at the touch position corresponding voltage M1 is higher than that corresponding voltage M2, i.e. the touch pressure at the touch position A3 is larger than that at the touch position B3.

Figure 11D:
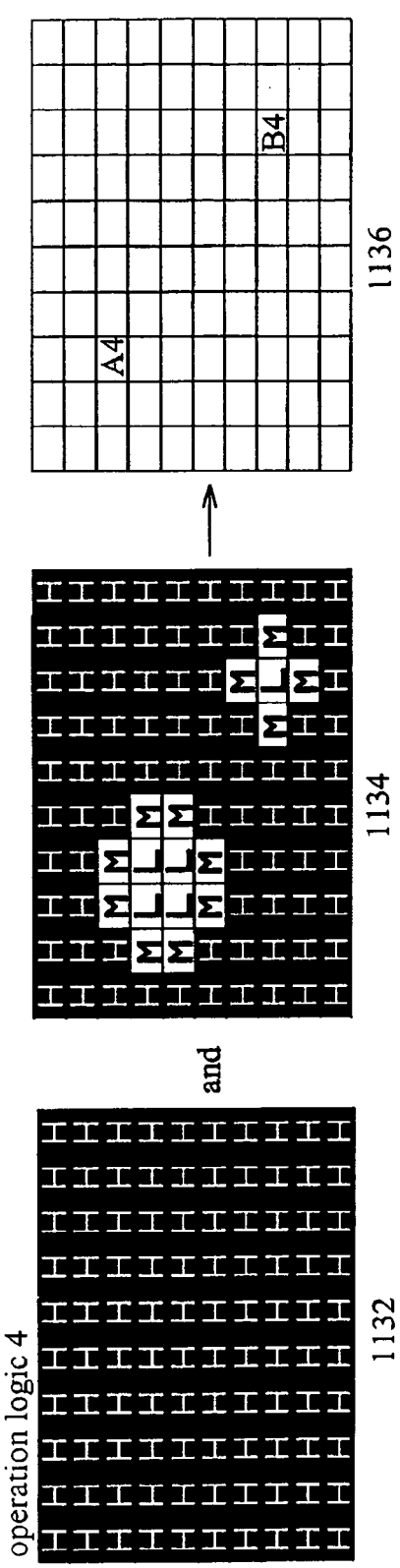

In another embodiment, the magnitude of the force applied on the touch panel LCD device can be determined according to the touch area/shape along with logical computation. For example, FIG. 11D illustrates an operation logic for achieving pressure-sensitive function in accordance with another embodiment of the present invention, in which the Table 1132 shows the touch reference date written in to each touch unit (i.e. high voltage level, H), and Table 1134 shows the stored voltage read from each touch unit. The symbol M represents middle voltage level, and the symbol L represents low voltage level. The level of voltage can be determined by setting a plurality of threshold values in advance. For example, the following setting can be used: the threshold values can be set as 2V and 4V, voltage higher than 4V is set as H, voltage between 4V and 2V is set as M, and voltage lower than 2V is set as L. By comparing Table 1132 with Table 1134, coordinate of the touch position (A4, B4) can be obtained (as shown in Table 1136), and it can be determined that the touch pressure and area at the touch position A4 are larger than that at the touch position B4.

Figure 12:
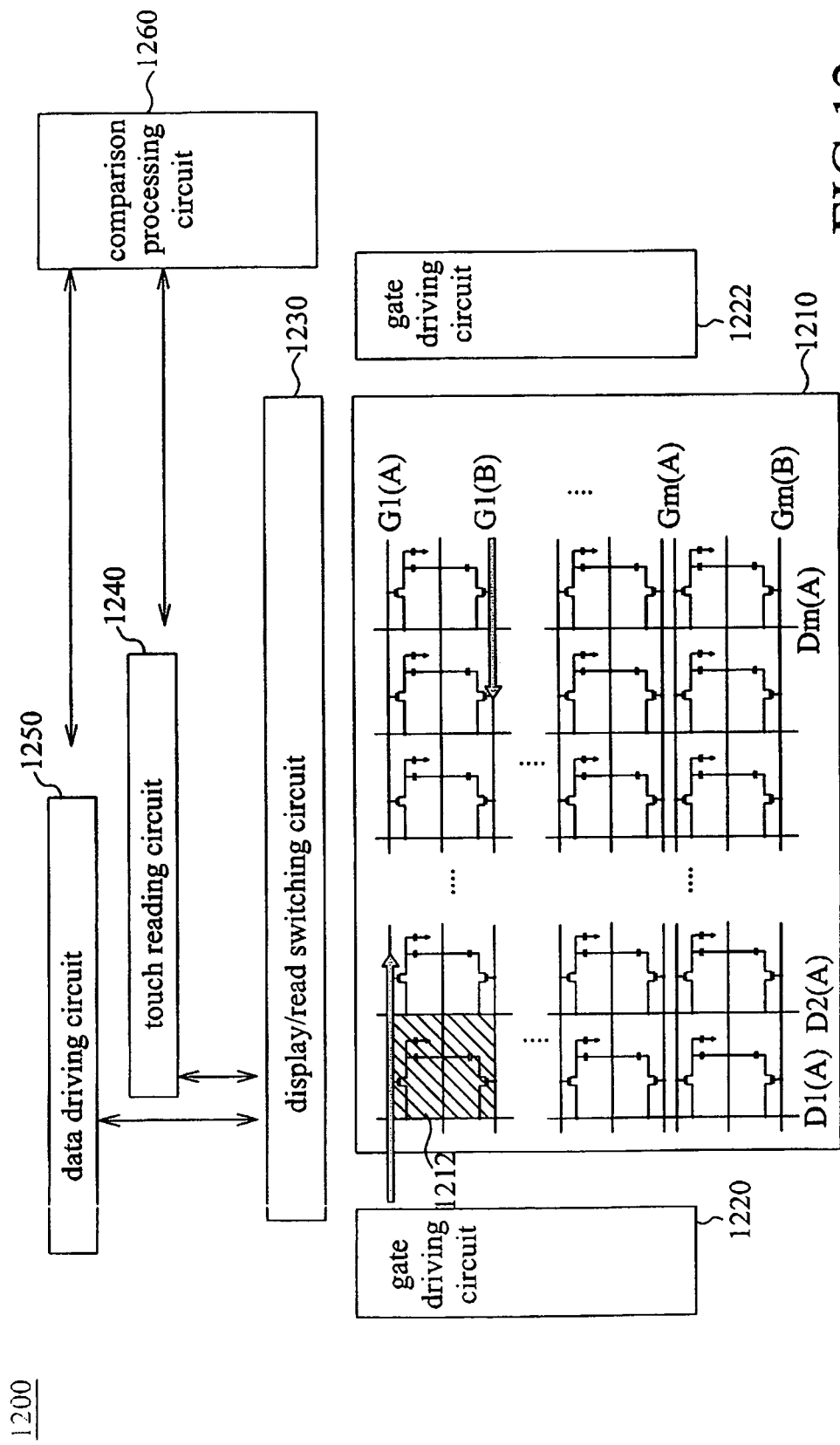
FIG. 12 illustrates a circuit structure of the integrated touch panel LCD device in FIG. 6 in accordance with another embodiment of the present invention.

FIG. 12 illustrates a circuit structure 1200 of the integrated touch panel LCD device in FIG. 6 in accordance with another embodiment of the present invention, which includes a liquid crystal panel 1210, a gate driving circuit 1220 and 1222, a display/read switching circuit 1230, a touch reading circuit 1240, a data driving circuit 1250, and a comparison processing circuit 1260. Each pixel structure 1212 of the liquid crystal panel 1210 includes a display unit and a touch unit, and is driven by two gate lines and one data line. The gate driving circuit 1220 is configured to input control signals to the gate lines G1(A)-Gm(A) for driving the display units of the pixel structures 1212, and the gate driving circuit 1222 is configured to input control signals to the gate lines G1(B)-Gm(B) for driving the touch units of the pixel structures 1212. The data driving circuit 1250 is configured to transmit display data to each of the display units and transmit touch reference data to each of the touch units through each of the data lines D1(A), D2(A), . . . , and Dm(A), and the touch reading circuit 1240 is configured to read the data stored in each of the touch units through each of the data lines D1(A), D2(A), . . . , and Dm(A). The display/read switching circuit 1230 connects to the data driving circuit 1250 and the touch reading circuit 1240 respectively for switching the data driving circuit 1250 and the touch reading circuit 1240 to electrically connect with the data lines D1(A), D2(A), . . . , and Dm(A) at different time. The comparison processing circuit 1260 connects with the data driving circuit 1250 and touch reading circuit 1240 respectively for comparing the touch reference data written into the data lines D1(A), D2(A), . . . , and Dm(A) by the data driving circuit 1250 and the data read from the data lines D1(A), D2(A), . . . , and Dm(A) by the touch reading circuit 1240 to obtain coordinate of the touch position. It should be noted that the comparison processing circuit 1260 can obtain the coordinate of the touch position only based on the data read out by the touch reading circuit 1240. Comparing with the circuit structure 700 adopting single gate driving circuit 720 as shown in FIG. 7, the circuit structure 1200 of FIG. 12 adopts two gate driving circuits 1220 and 1222 for driving display unit and touch unit respectively, whereby the pin number of each of the gate driving circuits 1220 and 1222 can be halved and the operation frequency can be reduced.

Figure 13:
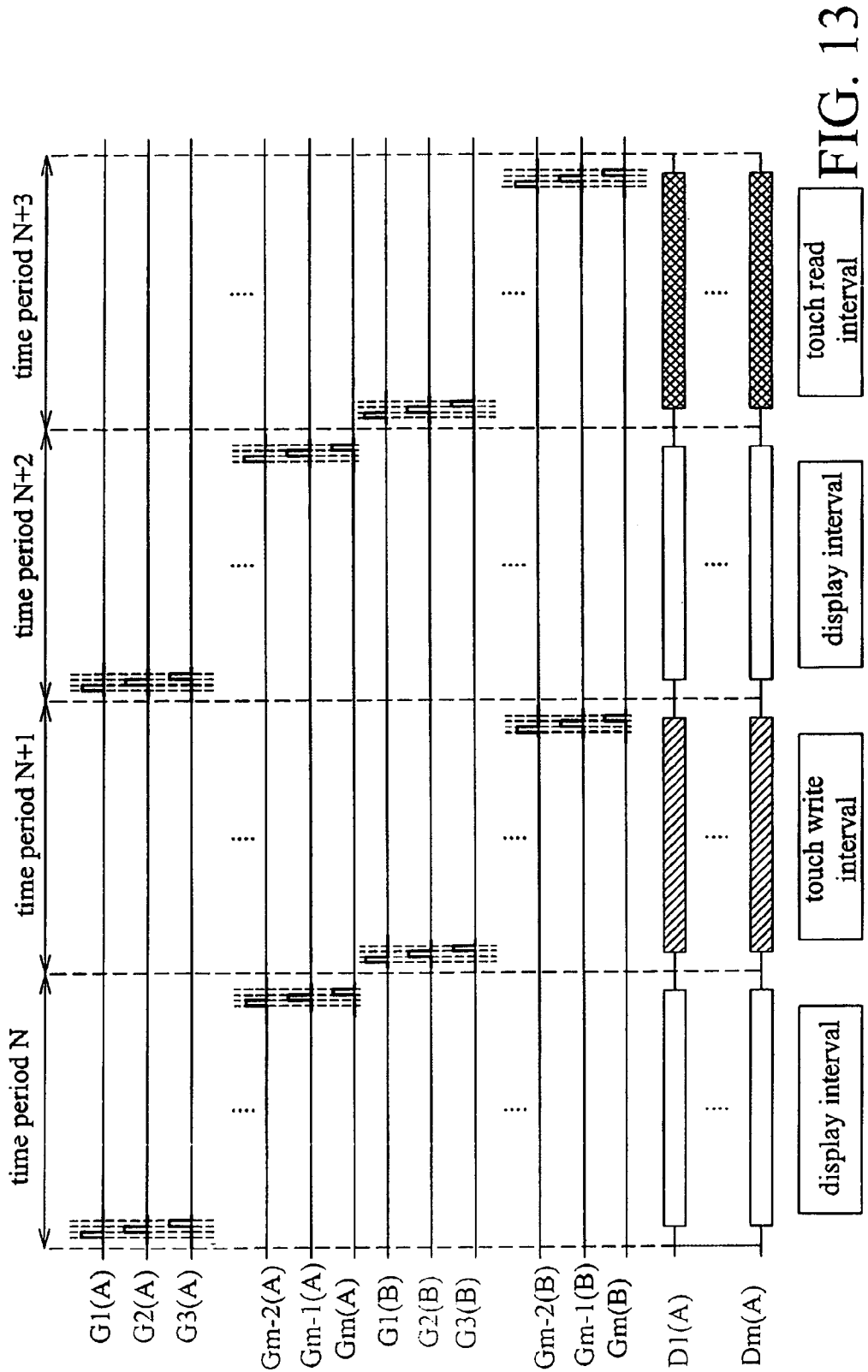
FIG. 13 is a timing diagram of signals on each of gate lines and data lines in the circuit of FIG. 12.

FIG. 13 is a timing diagram of signals on each of the gate lines and the data lines in the circuit of FIG. 12. Referring to FIGS. 12 and 13 together, during the N-th time period, the gate driving circuit 1220 sequentially inputs m pulses to the gate lines G1(A)-Gm(A), respectively, for turning on transistors of each display unit sequentially. In the meantime, the data driving circuit 1250 transmits the display data to each of the data lines D1(A), D2(A), . . . , Dm(A) through the display/read switching circuit 1230 for updating the data stored in each of the display units. Next, during the (N+1)-th time period, the gate driving circuit 1222 sequentially inputs m pulses to the gate lines G1(B)-Gm(B), respectively, for turning on transistors of each touch unit sequentially, and the data driving circuit 1250 transmits the touch reference data to each of the data lines D1(A), D2(A), . . . , Dm(A) through the display/read switching circuit 1230 for writing data into each of the touch units. Next, during the (N+2)-th time period, the gate driving circuit 1220 sequentially inputs m pulses to the gate lines G1(A)-Gm(A) again, and updates the data stored in each display unit through the data driving circuit 1250 again. Next, during the (N+3)-th time period, gate driving circuit 1222 sequentially inputs m pulses to the gate lines G1(B)-Gm(B), and the touch reading circuit 1240 electrically connects with each of the data lines D1(A), D2(A), . . . , Dm(A) for reading the data stored in each of the touch units. As described, coordinate of the touch position can be determined precisely by comparing the touch reference data written during the (N+1)-th time period and the data read during the (N+3)-th time period.

Figure 14:
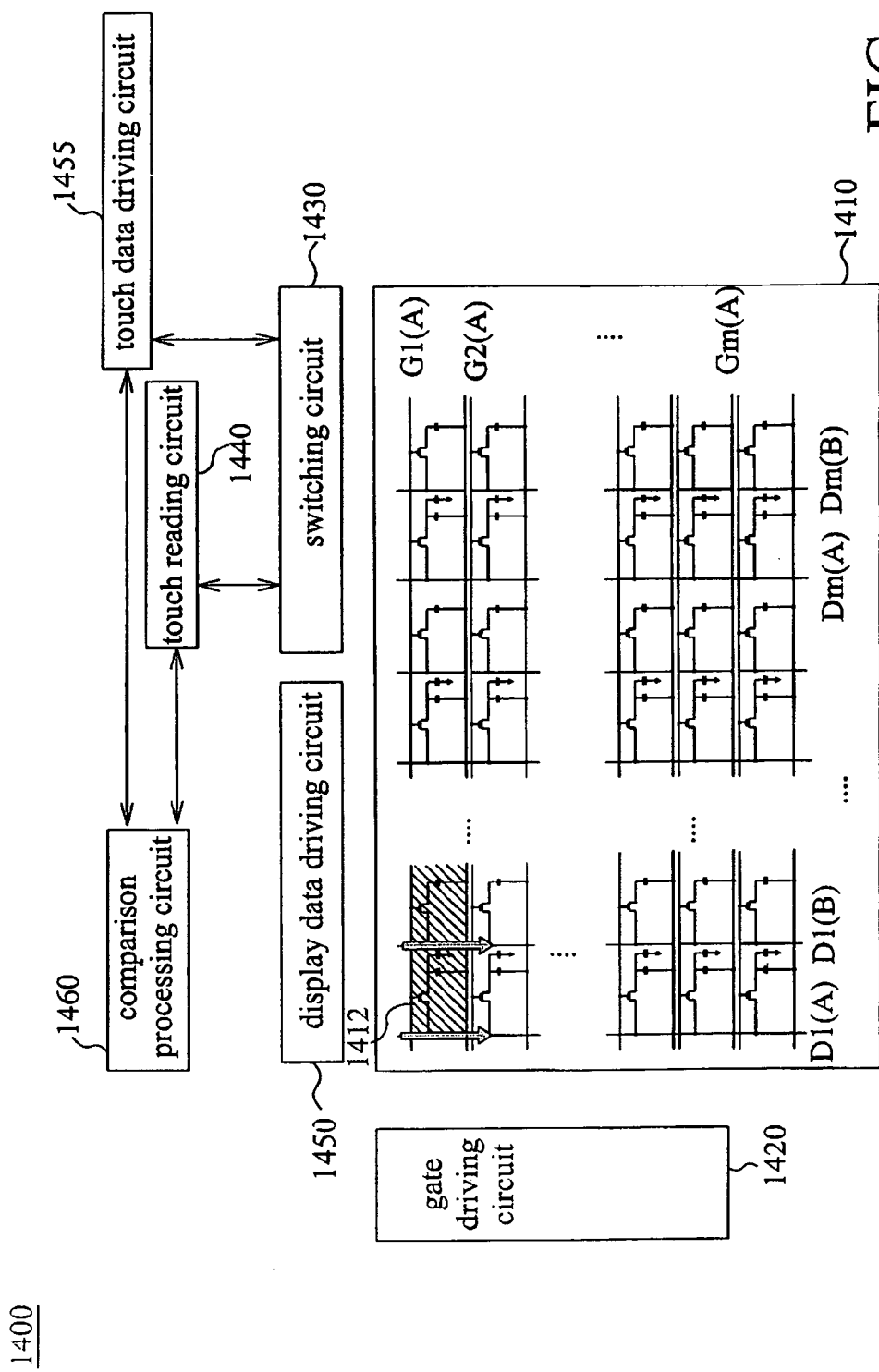
FIG. 14 illustrates a circuit structure of the integrated touch panel LCD device in FIG. 6 in accordance with another embodiment of the present invention.

FIG. 14 illustrates a circuit structure 1400 of the integrated touch panel LCD device in FIG. 6 in accordance with another embodiment of the present invention, which includes a liquid crystal panel 1410, a gate driving circuit 1420, a switching circuit 1430, a touch reading circuit 1440, a display data driving circuit 1450, a touch data driving circuit 1455, and a comparison processing circuit 1460. Each pixel structure 1412 of the liquid crystal panel 1410 includes a display unit and a touch unit, and is driven by one gate line and two data lines. In this embodiment, the gate driving circuit 1420 is configured to input control signals to the gate lines G1(A)-

Gm(A) for driving the display units and touch units of the pixel structures 1412. The display data driving circuit 1450 is configured to transmit display data to each of the display units through the data lines D1(A), D2(A), ..., and Dm(A). The touch data driving circuit 1455 is configured to transmit touch reference data to each of the touch units through each of the data lines D1(B), D2(B), ..., and Dm(B), and the touch reading circuit 1440 is configured to read the data stored in each of the touch units through each of the data lines D1(B), D2(B), ..., and Dm(B). The switching circuit 1430 connects to the touch data driving circuit 1455 and the touch reading circuit 1440 respectively for switching the touch data driving circuit 1455 and the touch reading circuit 1440 to electrically connect with the data lines D1(B), D2(B), ..., and Dm(B) at different time. The comparison processing circuit 1460 connects with the touch data driving circuit 1450 and touch reading circuit 1440 respectively for comparing the data written by the touch data driving circuit 1450 and the data read by the touch reading circuit 1440 to obtain coordinate of the touch position.

Figure 15:
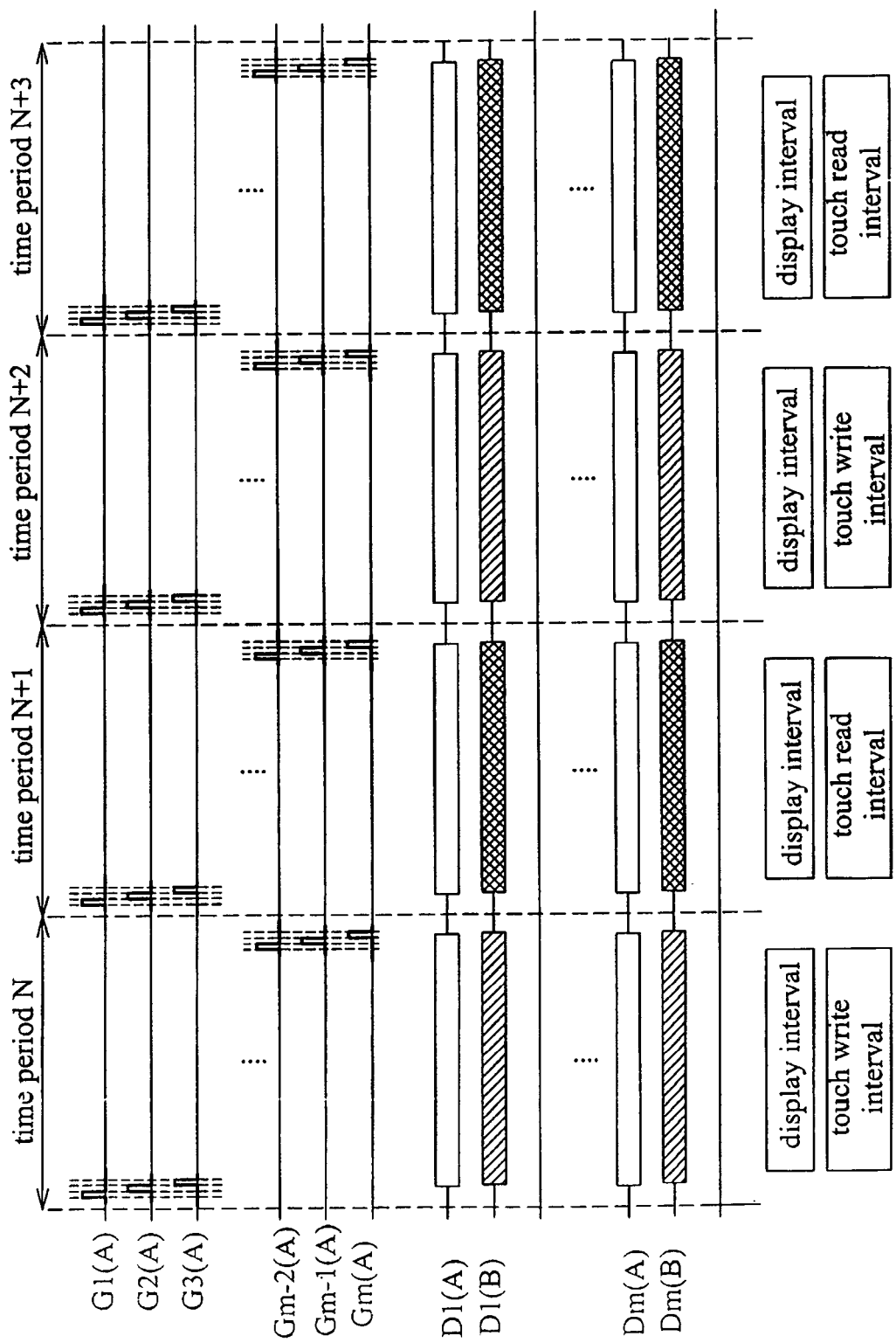
FIG. 15 is a timing diagram of signals on each of gate lines and data lines in the circuit of FIG. 12.

FIG. 15 is a timing diagram of signals on each of the gate lines and the data lines in the circuit of FIG. 14. Referring to FIGS. 14 and 15 together, during each time period, the gate driving circuit 1420 sequentially inputs m pulses to the gate lines G1(A)-Gm(A), and, for each pixel, the transistor of the display unit and the transistor of the touch unit are turned on simultaneously. During the N-th time period, the display data driving circuit 1450 transmits the display data to each of data lines D1(A), D2(A), ..., Dm(A) for updating the data in each display unit, and in the meantime the touch data driving circuit 1455 transmit touch reference data to each of data lines D1(B), D2(B), ..., Dm(B) through the switching circuit 1430 for writing data into each of the touch units. Next, during the (N+1)-th time period, the display data driving circuit 1450 updates the data in each display unit again, and the touch reading circuit 1440 electrically connects with each of the data lines D1(B), D2(B), ..., Dm(B) for reading the data stored in each of the touch units. Next, during the (N+2)-th time period, the operation of each circuit element during the N-th time period is performed again, i.e. updating the data in each display unit and writing data into each touch unit. Next, during the (N+3)-th time period, the operation of each circuit element during the (N+1)-th time period is performed again, i.e. updating the data in each display unit and reading the data stored in each touch unit. As described above, coordinate of the touch position can be determined precisely by comparing the touch reference data written during the N-th time period and the data read during the (N+1)-th time period.

It should be noted that the circuit structures and the timing diagrams described above are intended only for illustration, and are not intended to limit the present invention. For example, in the embodiment shown in FIG. 15, the touch reference data written into each touch unit may be independent of the display data written into each display unit. However, in another embodiment, the touch reference data written into each touch unit may be the same as the display data written into each display unit, i.e. the display data driving circuit 1450 may replace the touch data driving circuit 1455 to write data into the touch units. In still another embodiment, the update frequency of the touch unit can be adjusted according to actual applications. For example, each time after the display unit performs update operation for twice to five times, the touch unit may perform write/read operation only once for reducing the power consumption. In addition, the thin-film transistor matrix substrate can be replaced by a substrate with other type of transistors or switch elements. For example, the CMOS transistor matrix substrate may replace the thin-film transistor matrix substrate for a reflective liquid crystal display.

Figure 16:
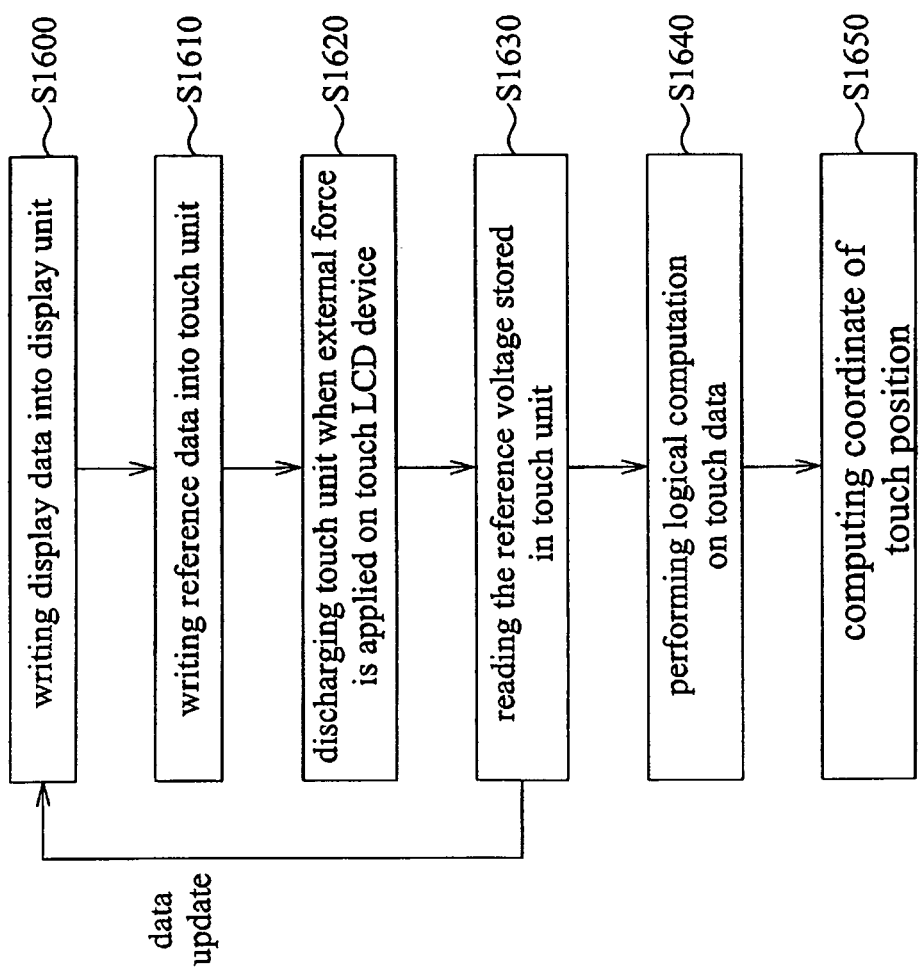
FIG. 16 illustrates a method for controlling an integrated touch panel LCD device in accordance with one embodiment of the present invention.

FIG. 16 illustrates a method for controlling an integrated touch panel LCD device in accordance with one embodiment of the present invention. First, in the step S1600, the display data are written into the display units of the integrated pixel structures for updating a display image of the liquid crystal panel. Next, in step S1610, the touch reference data are written into the touch units of the integrated pixel structures, wherein the touch reference data can either be the same as or be independent of the display data of step S1600. It should be noted that the step S1600 and the step S1610 can be performed separately or synchronously, and the operation frequency of each of step S1600 and step S1610 can be adjusted respectively based on the type of application. Next, in the step S1620, an external force applied on the touch panel LCD device forces the touch unit corresponding to the touch position to discharge, and the voltage value stored in said touch unit is reduced accordingly. Next, in step S1630, the reference voltages stored in touch units of each pixel structure are read, and, in some embodiments, the operation frequency of the step S1630 can be varied with that of the step S1610. Next, the procedure goes back to the step S1600, the display units are updated and the touch units are written and read again; meanwhile, the procedure also proceeds to step S1640, a logical computation on the data written and read in step S1610 and step S1630 respectively is performed. In the step S1640, the computation can be performed individually on each touch unit, such that the multi-touch function can be achieved. Furthermore, a threshold value can be set in advance for determining the degree of the force applied on the touch panel LCD device and filtering out the adverse noise. Next, in step S1650, the coordinate, touch area, and pressure on the touch position can be determined based on the result of the logical computation.

The integrated touch panel LCD device of the present invention can adopt one-layer structure, whereby the whole thickness can be reduced 30%-50% comparing with the conventional plug-in touch panel LCD device. The one-layer structure can avoid color non-uniformity defects (Mura), such as the Newton ring effect. Therefore, the present invention has advantages of small size, thin thickness, lightweight, and high reliability. Furthermore, the present invention can identify the locations of multiple points simultaneously and suppress noise by reading the data stored in the embedded touch units and performing comparison process, which can assure the accuracy of the touch position.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

I claim:

1. An integrated pixel structure, comprising:
   a transistor matrix substrate;
   a color filter substrate disposed above the transistor matrix substrate, the color filter substrate being substantially parallel with the transistor matrix substrate; and
   a liquid crystal layer interposed between the transistor matrix substrate and the color filter substrate,
   wherein the transistor matrix substrate comprises:
   a first transistor;
   a first storage capacitor connected to the first transistor;

a second transistor;
a second storage capacitor connected to the second transistor; and
a conductive protrusion disposed corresponding to the second storage capacitor and configured to electrically connect the second storage capacitor and the color filter substrate when the color filter substrate is pressed and configured not to electrically connect the second storage capacitor and the color filter substrate when the color filter substrate is not pressed, wherein charges in the second storage capacitor are discharged through the conductive protrusion and the color filter substrate when the second storage capacitor electrically connects to the color filter substrate which is pressed.

2. The integrated pixel structure to claim 1, wherein the first transistor comprises a first gate, a first source, and a first drain, and the second transistor comprises a second gate, a second source, and a second drain, wherein the first gate and the second gate connect to a first gate line and a second gate line respectively, and the first drain and the second drain both connect to a data line.

3. The integrated pixel structure according to claim 1, wherein the first transistor comprises a first gate, a first source, and a first drain, and the second transistor comprises a second gate, a second source, and a second drain, wherein the first gate and the second gate both connect to a gate line, and the first drain and the second drain connect to a first data line and a second data line respectively.

4. The integrated pixel structure according to claim 1, wherein the conductive protrusion is disposed on the transistor matrix substrate and spaced about 0.1 µm to 2 µm from the color filter substrate when the color filter substrate is not pressed.

5. The integrated pixel structure according to claim 1, wherein the conductive protrusion is disposed on the color filter substrate and spaced about 0.1 µm to 2 µm from the transistor matrix substrate when the color filter substrate is not pressed.

6. The integrated pixel structure according to claim 1, further comprising a spacer disposed around the conductive protrusion, wherein a height of the spacer is lower than a height of the conductive protrusion.

7. The integrated pixel structure according to claim 1, wherein the color filter substrate comprises a black matrix, and the second transistor and the second storage capacitor on the transistor matrix substrate are disposed corresponding to the black matrix.

8. The integrated pixel structure according to claim 1, wherein the conductive protrusion comprises resin and conductive particles therein.

9. The integrated pixel structure according to claim 1, wherein the transistor matrix substrate is a thin-film transistor matrix substrate or a CMOS transistor matrix substrate.

10. An integrated touch panel LCD device, comprising:
a liquid crystal panel comprising a plurality of integrated pixel structures, a plurality of gate lines, and a plurality of data lines;
wherein each of the integrated pixel structures includes: a transistor matrix substrate, a color filter substrate disposed above the transistor matrix substrate, the color filter substrate being substantially parallel with the transistor matrix substrate, and a liquid crystal layer interposed between the transistor matrix substrate and the color filter substrate, and
wherein the transistor matrix substrate comprises: a first transistor, a first storage capacitor connected to the first transistor, a second transistor, a second storage capacitor connected to the second transistor, and a conductive protrusion disposed corresponding to the second storage capacitor and configured to electrically connect the second storage capacitor and the color filter substrate when the color filter substrate is pressed and configured not to electrically connect the second storage capacitor and the color filter substrate when the color filter substrate is not pressed, wherein charges in the second storage capacitor are discharged through the conductive protrusion and the color filter substrate when the second storage capacitor electrically connects to the color filter substrate which is pressed;
a gate driving circuit configured to output a control signal to the plurality of gate lines;
a data driving circuit configured to output display data and touch reference data to the plurality of data lines;
a touch reading circuit coupled to the plurality of data lines for reading data stored in the second storage capacitors of the plurality of integrated pixel structure; and
a comparison circuit coupled to the touch reading circuit for receiving and calculating the stored data to obtain touching information corresponding to a touch position on the liquid crystal panel.

11. The integrated touch panel LCD device according to claim 10, further comprising a switching circuit coupled to the data driving circuit and the touch reading circuit, the switching circuit selectively connecting at least part of the plurality of data lines to the data driving circuit or to the touch reading circuit.

12. The integrated touch panel LCD device according to claim 10, wherein the first and the second transistors in each of the plurality of integrated pixel structures respectively connect to two gate lines of the plurality of gate lines and both connect to one data line of the plurality of data lines, wherein the gate driving circuit further comprises:
a first gate driving circuit configured to output the control signal to the gate lines connected to the first transistors for sequentially turning on the first transistors of the plurality of integrated pixel structures; and
a second gate driving circuit configured to output the control signal to the gate lines connected to the second transistors for sequentially turning on the second transistors of the plurality of integrated pixel structures.

13. The integrated touch panel LCD device according to claim 10, wherein the first and the second transistors in each of the plurality of integrated pixel structures respectively connect to two data lines of the plurality of data lines, and both connect to one gate line of the plurality of gate lines, wherein the data driving circuit further comprises:
a display data driving circuit configured to output the display data to the data lines connected to the first transistors; and
a touch data driving circuit configured to output the touch reference data to the data lines connected to the second transistors.

14. The integrated touch panel LCD device according to claim 10, wherein the comparison circuit has a threshold voltage, and the comparison circuit compares the stored data and the threshold voltage to obtain the touching information.

15. The integrated touch panel LCD device according to claim 10, wherein the comparison circuit is coupled to the data driving circuit for receiving the touch reference data, and the comparison circuit compares the touch reference data and the stored data to obtain the touching information.

16. The integrated touch panel LCD device according to claim 10, wherein the liquid crystal panel further comprises a plurality of display pixel structures, each of the plurality of display pixel structures comprising a display transistor and a display storage capacitor.

17. A method for controlling an integrated touch panel LCD device, the integrated touch panel LCD device comprising a liquid crystal panel, the liquid crystal panel comprising a plurality of integrated pixel structures, a plurality of data lines, and a plurality of gate lines, wherein each of the integrated pixel structures includes: a transistor matrix substrate, a color filter substrate disposed above the transistor matrix substrate, the color filter substrate being substantially parallel with the transistor matrix substrate, and a liquid crystal layer interposed between the transistor matrix substrate and the color filter substrate, and wherein the transistor matrix substrate comprises: a first transistor, a first storage capacitor connected to the first transistor, a second transistor, a second storage capacitor connected to the second transistor, and a conductive protrusion disposed corresponding to the second storage capacitor and configured to electrically connect the second storage capacitor and the color filter substrate when the color filter substrate is pressed and configured not to electrically connect the second storage capacitor and the color filter substrate when the color filter substrate is not pressed, wherein charges in the second storage capacitor are discharged through the conductive protrusion and the color filter substrate when the second storage capacitor electrically connects to the color filter substrate which is pressed, the method comprising the steps of:

transmitting display data to the first storage capacitors for updating a display image of the liquid crystal panel;

transmitting touch reference data to the second storage capacitors;

reading data stored in the second storage capacitors; and calculating the stored data to obtain touching information corresponding to a touch position on the liquid crystal panel.

18. The method according to claim 17, wherein the first and the second transistors of each of the plurality of integrated pixel structures respectively connect to two gate lines of the plurality of gate lines, and both connect to one data line of the plurality of data lines, the method further comprising:

turning on the first transistors of the plurality of integrated pixel structures sequentially during a first time period for transmitting the display data to the first storage capacitors through the first transistors;

turning on the second transistors of the plurality of integrated pixel structures sequentially during a second time period for transmitting the touch reference data to the second storage capacitors though the second transistors;

turning on the first transistors of the plurality of integrated pixel structures sequentially during a third time period for transmitting the display data to the first storage capacitors through the first transistors; and turning on the second transistors of the plurality of integrated pixel structures sequentially during a fourth time period for reading the data stored in the second storage capacitors through the second transistors.

19. The method according to claim 17, wherein the first and the second transistors of each of the plurality of integrated pixel structures respectively connect to two data lines of the plurality of data lines, and both connect to one gate line of the plurality of gate lines, the method further comprising:

turning on the first and the second transistors of the plurality of integrated pixel structures sequentially during a first time period for transmitting the display data to the first storage capacitors through the first transistors, and transmitting the touch reference data to the second storage capacitors through the second transistors; and turning on the first and the second transistors of the plurality of integrated pixel structures sequentially during a second time period, for transmitting the display data to the first storage capacitors through the first transistors and reading the data stored in the second storage capacitors through the second transistors.

20. The method according to claim 17, further comprising: comparing the stored data and the touch reference data to obtain the touching information.

21. The method according to claim 17, further comprising: setting a threshold voltage; and comparing the stored data and the threshold voltage to obtain the touching information.

22. The method according to claim 17, wherein the display data and the touch reference data are the same.

23. The method according to claim 17, wherein the touching information comprise coordinate of the touch position, touching area, or pressure on the touch position.

* * * * *